US012792347B2

(12) United States Patent
Savage et al.

(10) Patent No.: US 12,792,347 B2
(45) Date of Patent: Nov. 10, 2026

(54) TECHNIQUE FOR PERFORMING OUTER PRODUCT OPERATIONS

(71) Applicant: Arm Limited, Cambridge (GB)

(72) Inventors: Joe Savage, Cambridge (GB); Alejandro Martinez Vicente, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/872,221

(22) PCT Filed: May 23, 2023

(86) PCT No.: PCT/GB2023/051347
§ 371 (c)(1),
(2) Date: Dec. 5, 2024

(87) PCT Pub. No.: WO2023/242531
PCT Pub. Date: Dec. 21, 2023

(65) Prior Publication Data

US 2025/0362909 A1 Nov. 27, 2025

(30) Foreign Application Priority Data

Jun. 13, 2022 (GB) ..................................... 2208606

(51) Int. Cl.
*G06F 9/30* (2018.01)
*G06F 7/544* (2006.01)
(Continued)

(52) U.S. Cl.
CPC ........ *G06F 9/30036* (2013.01); *G06F 7/5443* (2013.01); *G06F 9/3001* (2013.01);
(Continued)

(58) Field of Classification Search
CPC .. G06F 9/30036; G06F 7/5443; G06F 9/3001; G06F 9/30109; G06F 17/16; G06N 3/063
See application file for complete search history.

(56) References Cited

U.S. PATENT DOCUMENTS 5,333,117 A 7/1994 Ha et al.
12,288,071 B2 * 4/2025 Stephens ............. G06F 9/30038
(Continued)

FOREIGN PATENT DOCUMENTS

WO 2022/023701 A1 2/2022

OTHER PUBLICATIONS

Combined Search and Examination Report for international application No. GB2208606.0, dated Feb. 14, 2023.
(Continued)

*Primary Examiner* — Corey S Faherty
(74) *Attorney, Agent, or Firm* — NIXON & VANDERHYE P.C.

(57) ABSTRACT

An apparatus has processing circuitry to perform vector operations, an instruction decoder to decode instructions to control the processing circuitry to perform associated vector operations, and array storage comprising storage elements to store data elements, the array storage storing at least one two dimensional array of data elements. The set of instructions includes a multiple outer product instruction identifying a first source vector operand, a second source vector operand, and a given two dimensional array of data elements within the array storage forming a destination operand. At least the first source vector operand identifies at least one vector of data elements to be treated as comprising a plurality of sub-vectors and at least the second source vector operand identifies a plurality of vectors of data elements. In response to the multiple outer product instruction, the instruction decoder controls the processing circuitry to perform an outer
(Continued)

product operation for each sub-vector identified by the first source vector operand. Each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements. Selection circuitry controls selection of the data elements processed by each outer product operation so as to switch between vectors of the second source vector operand when switching between different sub-vectors within a given vector of the first source vector operand.

18 Claims, 17 Drawing Sheets

(51) Int. Cl.
*G06F 17/16* (2006.01)
*G06N 3/063* (2023.01)

(52) U.S. Cl.
CPC .......... *G06F 9/30109* (2013.01); *G06F 17/16* (2013.01); *G06N 3/063* (2013.01)

(56) References Cited

U.S. PATENT DOCUMENTS

2018/0074824 A1* 3/2018 Sazegari ............. G06F 9/30101
2021/0182359 A1* 6/2021 Olsson ...................... G06F 7/72

OTHER PUBLICATIONS

An International Search Report and written opinion for an international application No. PCT/GB2023/051347, dated Aug. 14, 2024.
Tukanov et al., "Modeling Matrix Engines for Portability and Performance", IEEE International Parallel and Distributed Processing Symposium (IPDPS), 2022, pp. 1173-1183.
Veras et al., "A Systematic Approach for Obtaining Performance on Matrix-Like Operations," Aug. 31, 2017.
Office Action for IN Application No. 202417097555 dated Jan. 27, 2026, 11 pages.

* cited by examiner

SWITCH BETWEEN VECTORS OF OTHER SOURCE VECTOR OPERAND AS SWITCH BETWEEN SUB-VECTORS IN ANY GIVEN VECTOR OF FIRST SOURCE VECTOR OPERAND

FMOPA16 ZA0.S, <Pn>/M, <Pm>/M, { z0.s, z1.s, z2.s, z3.s }, z4.s

TECHNIQUE FOR PERFORMING OUTER PRODUCT OPERATIONS

BACKGROUND

The present technique relates to the field of data processing, and more particularly to the performance of outer product operations.

Some modern data processing systems may provide an array storage for storing one or more two-dimensional arrays of data elements that can be accessed by processing circuitry of the data processing system when performing data processing operations. This can provide an efficient mechanism for performing a number of different types of operations, for example outer product operations. Considering two input operand vectors, then the outer product of those two vectors is a matrix of data elements produced by multiplying each data element of one operand by each data element of the other operand. If the two vectors have dimensions M and N, then their outer product is an M×N matrix. The provision of an array storage that can store two-dimensional arrays of data elements can provide a useful mechanism for storing the results of such outer products operations.

Outer product operations can be useful in modern data processing systems when implementing various types of computations. For example, the use of outer product operations can be used to accelerate matrix multiplication. However, in order to improve efficiency and performance, it is desirable to make efficient use of the array storage, and improve utilisation of processing circuitry/multiply-accumulate resources provided within a data processing system.

SUMMARY

In one example arrangement, there is provided an apparatus comprising: processing circuitry to perform vector operations; instruction decoder circuitry to decode instructions from a set of instructions to control the processing circuitry to perform the vector operations specified by the instructions; array storage comprising storage elements to store data elements, the array storage being arranged to store at least one two dimensional array of data elements accessible to the processing circuitry when performing the vector operations; wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements; wherein the instruction decoder circuitry is arranged, in response to the multiple outer product instruction, to control the processing circuitry to perform an outer product operation for each sub-vector identified by the first source vector operand, and each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements; wherein the processing circuitry comprises selection circuitry to control selection of the data elements processed by each outer product operation so as to switch between vectors of the second source vector operand when switching between different sub-vectors within a given vector of the first source vector operand.

In another example arrangement, there is provided a method of performing outer product operations, comprising: employing processing circuitry to perform vector operations; employing instruction decoder circuitry to decode instructions from a set of instructions to control the processing circuitry to perform the vector operations specified by the instructions; providing array storage comprising storage elements to store data elements, the array storage being arranged to store at least one two dimensional array of data elements accessible to the processing circuitry when performing the vector operations; wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements; controlling the processing circuitry to perform, in response to the multiple outer product instruction being decoded by the instruction decoder circuitry, an outer product operation for each sub-vector identified by the first source vector operand, where each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements; and controlling selection of the data elements processed by each outer product operation so as to switch between vectors of the second source vector operand when switching between different sub-vectors within a given vector of the first source vector operand.

In a still further example arrangement, there is provided a computer program for controlling a host data processing apparatus to provide an instruction execution environment, comprising: processing program logic to perform vector operations; instruction decode program logic to decode instructions from a set of instructions to control the processing program logic to perform the vector operations specified by the instructions; array storage emulating program logic to emulate an array storage comprising storage elements to store data elements, the array storage being arranged to store at least one two dimensional array of data elements accessible to the processing program logic when performing the vector operations; wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements; wherein the instruction decode program logic is arranged, in response to the multiple outer product instruction, to control the processing program logic to perform an outer product operation for each sub-vector identified by the first source vector operand, and each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements; wherein the processing program logic comprises selection program logic to control selection of the data elements processed by each outer product operation so as to switch between vectors of the second source vector operand when switching between different sub-vectors within a given vector of the first source vector operand.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
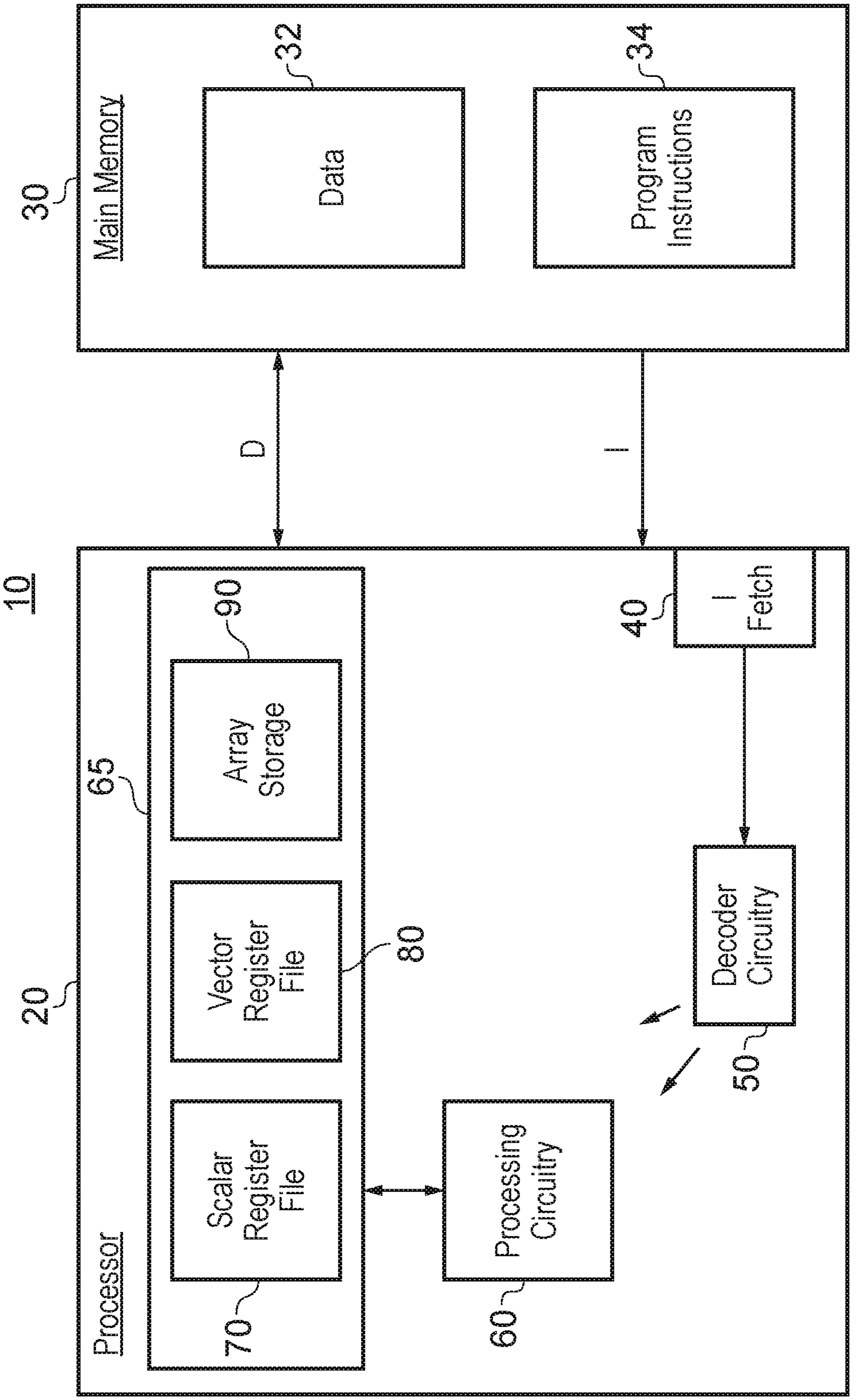
FIG. 1 is a block diagram of an apparatus in accordance with one example implementation.

In accordance with example implementations discussed herein, an apparatus is provided that has processing circuitry for performing vector operations, and instruction decoder circuitry for decoding instructions from a set of instructions in order to control the processing circuitry to perform the vector operations specified by those instructions. An array storage is also provided that comprises storage elements to store data elements. The array storage is arranged to store at least one two-dimensional array of data elements accessible to the processing circuitry when performing the vector operations.

As mentioned earlier, the use of an array storage can provide a useful mechanism for performing certain types of operations, for example outer product operations. In particular, the matrix of data elements produced as a result of performing an outer product operation can be stored within associated data elements of a two-dimensional array within the array storage. However, it is beneficial to make efficient use of the available storage elements within a given two-dimensional array, as this can assist in increasing performance of the system. It would also be beneficial to make better use of the hardware multiply-accumulate resources provided within the system, which in some implementations may already be provided within the system per storage element within the array to support other computations that may take place using a two dimensional array within the array storage.

In accordance with the techniques described herein, the set of instructions is arranged to include a "multiple outer product instruction", such an instruction identifying two source vector operands, and a given two-dimensional array of data elements within the array storage forming a destination operand. Further, at least one of the source vector operands (referred to herein as "the first source vector operand", although it should be noted that this first source vector operand can be either of the two source vector operands specified by the multiple outer product instruction, and there is no requirement for it to be the first input operand specified by the instruction) identifies at least one vector of data elements to be treated as comprising a plurality of sub-vectors. Further, at least the other of the source vector operands (referred to herein as "the second source vector operand", although it should be noted that this second source vector operand can be either of the two source vector operands specified by the multiple outer product instruction, and there is no requirement for it to be the second input operand specified by the instruction) identifies a plurality of vectors of data elements.

The instruction decoder is arranged, in response to the multiple outer product instruction, to control the processing circuitry to perform an outer product operation for each sub-vector identified by the first source vector operand. Each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements. The group of data elements selected from the second source vector operand may depend on whether the second source vector operand is also considered to comprise multiple sub-vectors or not. Hence, in one example implementation, if the second source vector operand is considered to comprise multiple sub-vectors, then the group of data elements selected from the second source vector operand may be those data elements belonging to a selected sub-vector of the second source vector operand, but if the second source vector operand is not considered to comprise multiple sub-vectors, then the group of data elements selected from the second source vector operand may be those data elements belonging to a selected vector of the second source vector operand.

The processing circuitry further comprises selection circuitry to control selection of the data elements processed by each outer product operation so as to switch between vectors of the second source vector operand when switching between different sub-vectors within a given vector of the first source vector operand.

The inventors realised that in some example use cases, when performing an outer product operation using two source vectors, it may be the case that the dimension of one or both of those source vectors is smaller than the corresponding dimension of the two-dimensional array to be used to store the results of the outer product operation. This can result in inefficient use of the storage elements of the two-dimensional array, since a significant number of those storage elements may not then be used, and also can result in inefficient use of the resources of the hardware components forming the processing circuitry (which may be capable of performing computations to produce results for each of the storage elements). However, in accordance with the techniques described herein, a single instruction (namely the multiple outer product instruction discussed above) can be defined that, through the use of sub-vectors within one or both of the source vector operands, enables multiple outer product operations to be performed, with the results of each outer product operation being stored within associated storage elements of the two-dimensional (2D) array. This can significantly improve throughput, by enabling multiple outer product operations to be performed in response to a single instruction (in one example implementation those multiple outer product operations can be performed in parallel), whilst also making more efficient utilisation of the available storage elements within the array storage.

Through execution of the multiple outer product instruction described herein, one or more rows and/or columns of the 2D array can be arranged to capture results generated for more than one outer product operation, by using more than one sub-vector provided within a given input vector when computing the outer product results used to update those one or more rows and/or columns.

Expressed another way, for each vector register within a single source vector operand, separate outer product operations are performed and hence the total number of outer products is in one example implementation determined by the product of the number of vectors provided by both source vector operands. Further, each outer product operation uses a subset of the input data elements (a sub-vector) of at least one source vector operand.

Within any given vector of data elements that is to be treated as comprising a plurality of sub-vectors, the various sub-vectors can be considered as occupying associated sub-vector regions within the given vector of data elements. In some instances, each sub-vector may occupy the entirety of the associated sub-vector region, but in other example implementations some data element positions within the given vector may be unused, and accordingly one or more of the sub-vectors may not occupy the entire associated sub-vector region. It should also be noted that any particular sub-vector region does not need to be provided by contiguous data element positions within the given vector, and the various data elements forming any particular sub-vector hence need not be provided contiguously within the given vector.

The selection circuitry can take a variety of forms, but in one example implementation the selection circuitry may comprise, for each multiplication operation to be performed by the processing circuitry to generate a corresponding outer product result, associated multiplexer circuitry to select a data element from the first source vector operand and a data element from the second source vector operand to be subjected to the multiplication operation, with the selection made by the associated multiplexer circuitry being controlled in dependence on which outer product operation the corresponding outer product result relates to. When the hardware implementation provides separate multiplier circuitry for each of the multiplication operations to be performed, such an approach can enable the various multiplication operations to be performed in parallel.

Whilst at least the first source vector operand identifies a plurality of sub-vectors (provided in one or more vectors), and at least the second source vector operand identifies a plurality of vectors (as mentioned earlier, either one of the source vector operands specified by the instruction can be considered to be the first source vector operand, and the other source vector operand will then be considered to be the second source vector operand), it is possible for both the first and second source vector operands to identify multiple sub-vectors, and indeed it is also possible for both the first and second source vector operands to identify multiple vectors. In one particular example implementation, both the first source vector operand and the second source vector operand identify a plurality of vectors of data elements, and each vector is to be treated as comprising a plurality of sub-vectors. With such an arrangement it is possible for at least four outer product operations to be performed in response to the single multiple outer product instruction. Whilst the number of sub-vectors specified by each source vector operand in such an implementation could in principle differ, in one particular example arrangement each of the first source vector operand and the second source vector operand contain N sub-vectors, and the processing circuitry is arranged to perform N outer product operations.

In one example implementation where both the first and second source vector operands identify a plurality of vectors of data elements, each vector comprising a plurality of sub-vectors, the plurality of sub-vectors within each vector of the first source vector operand can be considered to have associated sub-vectors within different vectors of the second source vector operand. The selection circuitry may then be arranged to control selection of the data elements processed by each outer product operation such that, when switching between different sub-vectors within a given vector of the first source vector operand, a switch is made to a different vector of the second source vector operand so as to enable the data elements from the associated sub-vectors within the second source vector operand to be selected.

In an alternative example implementation, it may be the case that only one of the source vector operands identifies sub-vectors. For instance, the first source vector operand may contain a plurality P of sub-vectors, and the second source vector operand may comprise P vectors of data elements, where each vector in the second source vector operand is associated with one of the sub-vectors in the first source vector operand. Such an example implementation still allows multiple outer product operations to be performed in response to a single instruction, and allows for an efficient utilisation of the available storage elements within the two-dimensional array.

In one such example arrangement, the processing circuitry may be arranged to perform P outer product operations, where each outer product operation is performed using as inputs an associated sub-vector from the first source vector operand and an associated vector from the second source vector operand.

There are various ways in which sub-vectors may be specified within a given vector of a source vector operand. In one example implementation, for at least one given vector that is to be treated as comprising a plurality of sub-vectors, the data elements forming each sub-vector are provided at contiguous data element locations within the given vector.

However, it is not a requirement for the data elements forming a sub-vector to be provided at contiguous data element locations. Indeed, for at least one given vector that is to be treated as comprising a plurality of sub-vectors, the data elements forming each sub-vector may be provided at non-contiguous data element locations within the given vector. Such an approach allows greater flexibility in how the sub-vectors are arranged within a particular vector, allowing for example for the data elements of one sub-vector to be interleaved with the data elements of another sub-vector. Whilst in some implementations it may be possible to have one or more vectors with interleaved sub-vector elements and one or more vectors with contiguous sub-vector elements, in one example implementation the same scheme is used for each of the vectors containing sub-vectors.

In some implementations any given vector that is to be considered as being formed of multiple sub-vectors will be arranged such that every data element position contains a valid data element of one of the sub-vectors. However, this is not a requirement, and in an alternative implementation, for at least one given vector that is to be treated as comprising a plurality of sub-vectors, the given vector may have one or more unused data element locations that do not contain a data element of the plurality of sub-vectors. Whilst this may result in some of the storage elements within the destination 2D array being unused, it still enables multiple outer product operations to be performed in response to a single instruction, thereby enabling an improvement in performance/throughput, and also enables an improvement in utilisation of the 2D array when compared with an existing scheme that would only perform a single outer product operation in response to a single instruction. There are a number of ways in which the unused data element locations can be identified, but in one example implementation a predication technique is used, for example by specifying a predicate vector operand in association with one or more of the source vector operands, such a predicate vector operand providing one or more vectors of predicate values to identify, on a data element location by data element location basis, whether that data element location contains a data element to be included in the outer product operation.

There are various ways in which the source vector operands for the multiple outer product instruction can be specified. However, in one example implementation the apparatus further comprises a set of vector registers accessible to the processing circuitry, where each vector register is arranged to store a vector comprising a plurality of data elements, and the first source vector operand and the second source vector operand comprise vectors contained within vector registers of the set of vector registers. Hence, the multiple outer product instruction can identify each source vector operand by specifying one or more vector registers in the set of vector registers whose contents are to form that source vector operand.

In one example implementation, a vector length identifies a size of the vector registers in the set of vector registers and a size of the given two dimensional array of data elements within the array storage (for example the vector length can be used to specify both the x dimension and y dimension of the two-dimensional array). Some architectures may support a variable vector length, where for any particular instantiation of the apparatus the vector length may be fixed, but where the vector length may be varied between different instantiations of the apparatus, and with the same instructions being executable on any of those different instantiations of the apparatus. The techniques described herein may be particularly beneficially employed within an apparatus where the vector length is relatively large, as there are likely to be more instances where the outer product operations to be performed use one or more vectors/sub-vectors that are smaller than the specified vector length, and hence more opportunities to use the present technique to improve performance and 2D array utilisation.

In one example implementation, the multiple outer product instruction may be arranged to provide a sub-vector indicator used to determine the number of sub-vectors within each vector that is to be treated as comprising a plurality of sub-vectors, with a size of each sub-vector being dependent on the determined number of sub-vectors and the vector length. In one particular example implementation, the sub-vector indicator may be specified in a manner that is agnostic to the vector length. For instance, the sub-vector indicator may be arranged to identify that the vector is to be divided into two sub-vector regions (for example by identifying that each sub-vector region is half of the vector length), four sub-vector regions (for example by identifying each sub-vector region is a quarter of the vector length), etc., with the actual size of each sub-vector region then being dependent on the vector length.

Whilst in some implementations each sub-vector may occupy the entire associated sub-vector region, this is not a requirement, and in an alternative implementation a sub-vector may occupy only part of the associated sub-vector region, with the remaining part being unused (i.e. comprising one or more unused data element locations). In such cases, there are various ways in which the unused data element locations may be treated. For example, the hardware may compute results using the data elements in all data element locations, and then merely ignore the unwanted results later (i.e. effectively processing the inputs as though no data element locations are unused). However, alternatively, the earlier-mentioned predication techniques can be used to identify the individual data element locations that should not be used when performing the outer product computations. The use of such predication techniques can avoid generating unwanted results, and hence more readily facilitate merging of valid result data elements with the existing contents of the 2D array.

The sub-vector indicator could be specified in a variety of ways. For example, the sub-vector indicator could be an explicit field provided within the instruction, or could alternatively be implicitly specified by being part of the opcode used to define the instruction. Hence, a particular form of the multiple outer product instruction may have an explicit sub-vector indicator field to allow the number of sub-vectors to be specified, or alternatively there could be different variants of the multiple outer product instruction for each of the different numbers of sub-vectors to be supported. In one example implementation where an explicit sub-vector indicator field is provided, this could for example allow the sub-vector indicator to be set at runtime, for instance by providing within the sub-vector indicator a register identifier for a register whose contents define the number of sub-vectors.

The outer product operations performed in response to the multiple outer product instruction can take a variety of forms. However, in one example implementation, the multiple outer product instruction is an accumulate instruction and each outer product result is used to update an existing value held in the associated storage element within the given two dimensional array of storage elements by combining that outer product result with the existing value. The way in which the outer product result is combined with the existing value may vary dependent on implementation, but in one example implementation may involve either adding the outer product result to the existing value or subtracting the outer product result from the existing value. The use of the two-dimensional array can be particularly beneficial when performing such accumulation operations, as multiple iterations of an outer product operation can be performed, each of which produces results that are accumulated within the two-dimensional array.

Whilst in one example arrangement there will be a one-to-one correspondence between each outer product result generated and its corresponding associated storage element within the two-dimensional array, this is not a requirement, and in other example implementations the outer product operation performed may be such that multiple generated outer product results are associated with the same storage element in the two-dimensional array. By way of specific example, the multiple outer product instruction may be a sum of outer products instruction, resulting in multiple outer product results having the same associated storage element within the given two dimensional array of storage elements, and those multiple outer product results being combined in order to update the value held in the associated storage element. For example, each of the multiple outer product results associated with the same storage element may be added together when updating the value held in the associated storage element. As with the earlier examples, accumulating variants may be supported, so that the resultant sum of the various outer product results associated with a particular storage element are then added to, or subtracted from, the current value in the associated storage element in order to produce the new value to be stored within that storage element. When performing such sum of outer product operations, it will typically be the case that the individual data elements provided within the source vector operands are smaller than the data element size associated with each storage element in the two-dimensional array.

The techniques described herein provide a great deal of flexibility in how the various source vector operands are specified, including how many sub-vectors within those source vector operands are specified, and allow for performance, and utilisation of the 2D array, to be improved in many different scenarios. Just by way of specific example, in one particular use case both the first source vector operand and the second source vector operand comprise two vectors, each vector is formed of two sub-vectors, and the instruction decoder circuitry is arranged, in response to the multiple outer product instruction, to control the processing circuitry to perform four outer product operations with the results of those four outer product operations being stored within storage elements within associated regions of the given two dimensional array of storage elements. In implementations where the sub-vectors fully occupy each vector, this can allow the entirety of the 2D array to be used to store the results of the four outer product operations.

Particular example implementations will now be discussed with reference to the figures.

FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetched program instructions to instruction decoder circuitry 50. The decoder circuitry 50 decodes the fetched program instructions and generates control signals to control processing circuitry 60 to perform processing operations upon data values held within storage elements of register storage 65 as specified by the decoded vector instructions. As shown in FIG. 1, the register storage 65 may be formed of multiple different blocks. For example, a scalar register file 70 may be provided that comprises a plurality of scalar registers that can be specified by instructions, and similarly a vector register file 80 may be provided that comprises a plurality of vector registers that can be specified by instructions.

As also shown in FIG. 1, the processor 20 can access an array storage 90. In the example shown in FIG. 1, the array storage 90 is provided as part of the processor 20, but this is not a requirement. In various examples, the array storage can be implemented as any one or more of the following: architecturally-addressable registers; non-architecturally-addressable registers; a scratchpad memory; and a cache.

The processing circuitry 60 may in one example implementation comprise both vector processing circuitry and scalar processing circuitry. A general distinction between scalar processing and vector processing is as follows. Vector processing may involve applying a single vector processing instruction to data elements of a data vector having a plurality of data elements at respective positions in the data vector. The processing circuitry may also perform vector processing to perform operations on a plurality of vectors within a two dimensional array of data elements (which may also be referred to as a sub-array) stored within the array storage 90. Scalar processing operates on, effectively, single data elements rather than on data vectors. Vector processing can be useful in instances where processing operations are carried out on many different instances of the data to be processed. In a vector processing arrangement, a single instruction can be applied to multiple data elements (of a data vector) at the same time. This can improve the efficiency and throughput of data processing compared to scalar processing.

The processor 20 may be arranged to process two dimensional arrays of data elements stored in the array storage 90. The two-dimensional arrays may, in at least some examples, be accessed as one-dimensional vectors of data elements in multiple directions. In one example implementation, the array storage 90 may be arranged to store one or more two dimensional arrays of data elements, and each two dimensional array of data elements may form a square array portion of a larger or even higher-dimensioned array of data elements in memory.

Figure 2:
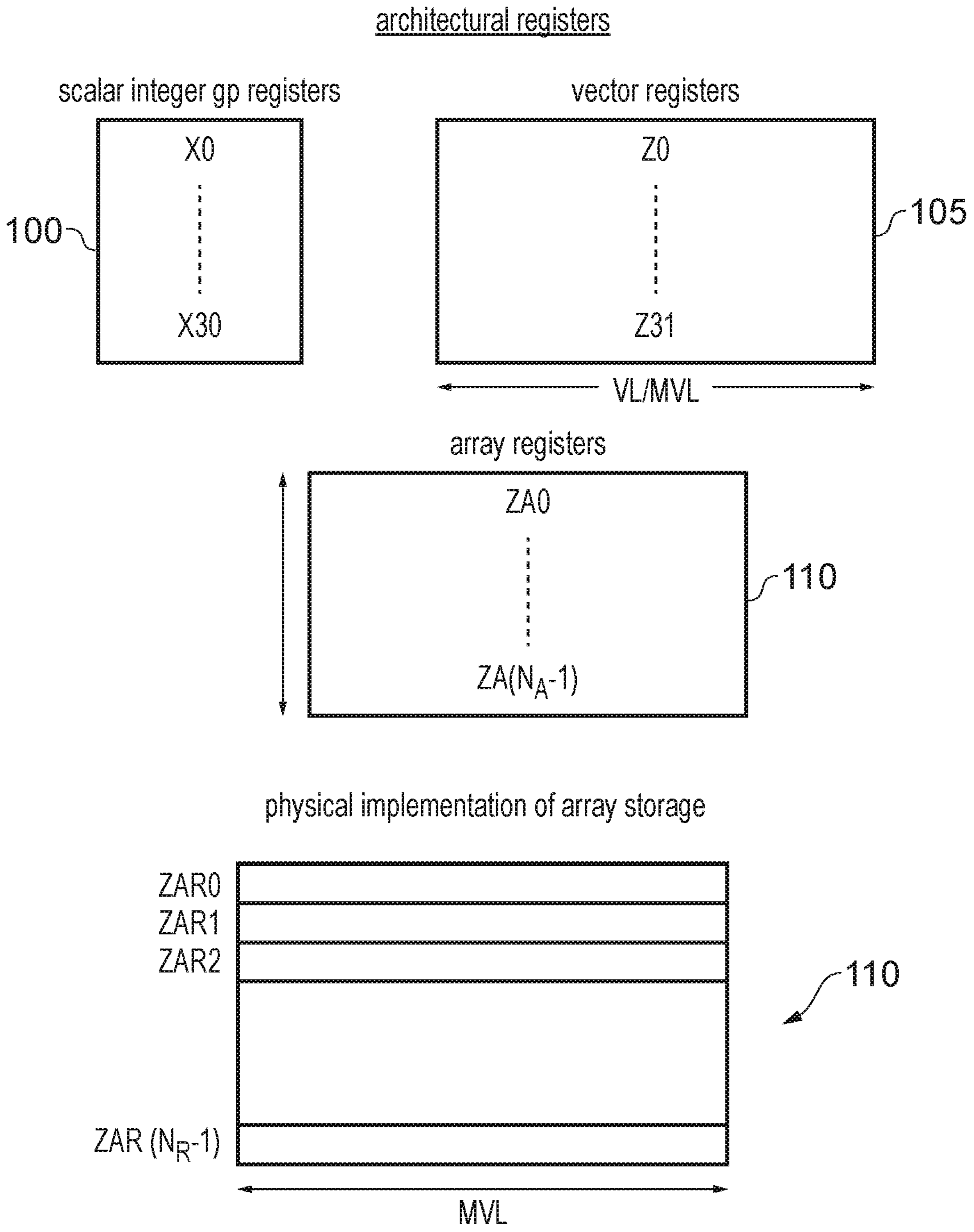
FIG. 2 shows an example of architectural registers that may be provided within the apparatus, including vector registers for storing vector operands and array registers for storing 2D arrays of data elements, including an example of a physical implementation of the array registers.

FIG. 2 shows an example of the architectural registers 65 of the processor 20 that may be provided in one example implementation. The architectural registers (as defined in the instruction set architecture (ISA)) may include a set of scalar integer registers 100 which act as general purpose registers for processing operations performed by scalar processing circuitry within the processing circuitry 60. For example, there may be a certain number of general purpose registers 100 provided, for example 31 registers X0-X30 in this example (the 32$^{nd}$ encoding of a scalar register field may not correspond to a register provided in hardware, as it may be considered by default to indicate a value of zero, for example, or could be used to indicate a dedicated type of register which is not a general purpose register). It may be possible to access scalar registers of different sizes mapped to the same physical storage. For example, the register labels X0-X30 may refer to 64-bit registers, but the same registers could also be accessed as 32-bit registers (e.g. accessed using the lower 32 bits of each 64-bit register provided in hardware), in which case register labels W0-W30 may be used in assembler code to reference the same registers.

Also, the architectural registers available for selection by program instructions in the ISA supported by the decoder 50 may include a certain number of vector registers 105 (labelled Z0-Z31 in this example). Of course, it is not essential to provide the number of scalar/vector registers shown in FIG. 2, and other examples may provide a different number of registers specifiable by program instructions. Each vector register may store a vector operand comprising a variable number of data elements, where each data element may represent an independent data value. In response to vector processing (SIMD) instructions, the processing circuitry may perform vector processing on vector operands stored in the registers to generate results. For example, the vector processing may include lane-by-lane operations where a corresponding operation is performed on each lane of elements in one or more operand vectors to generate corresponding results for elements of a result vector. When performing vector or SIMD processing, each vector register may have a certain vector length VL where the vector length refers to the number of bits in a given vector register. The vector length VL used in vector processing mode may be fixed for a given hardware implementation or could be variable. The ISA supported by the processor 20 may support variable vector lengths so that different processor implementations may choose to implement different sized vector registers but the ISA may be vector length agnostic so that the instructions are designed so that code can function correctly regardless of the particular vector length implemented on a given CPU executing that program.

The vector registers Z0-Z31 may also serve as operand registers for storing the vector operands which provide the inputs to processing and accumulate operations performed by the processing circuitry 60 on two dimensional arrays of data elements stored within the array storage 90. When the vector registers are used to provide inputs to such an operation, then the vector registers have a vector length MVL, which may be the same as the vector length VL used for vector operations, or could be a different vector length.

As shown in FIG. 2, the architectural registers also include a certain number NA of array registers 110 forming the earlier-mentioned array storage 90, ZA0-ZA($N_A$-1). Each array register can be seen as a set of register storage for storing a single 2D array of data elements, e.g. the result of a processing and accumulate operation. However, processing and accumulate operations may not be the only operations which can use the array registers. The array registers could also be used to store square arrays while performing transposition of the row/column direction of an array structure in memory. When a program instruction references one of the array registers 110, it is referenced as a single entity using an array identifier ZAi, but some types of instructions (e.g. data transfer instructions) may also select a sub-portion of the array by defining an index value which selects a part of the array (e.g. one horizontal/vertical group of elements).

In practice the physical implementation of the register storage corresponding to the array registers may comprise a certain number $N_R$ of array vector registers, ZAR0-ZAR($N_R$-1), as also shown in FIG. 2. The array vector registers ZAR forming the array register storage 110 may be a distinct set of registers from the vector registers Z0-Z31 used for SIMD processing and vector inputs to array processing. Each of the array vector registers ZAR may have the vector length MVL, so each array vector register ZAR may store a 1D vector of length MVL, which may be partitioned logically into a variable number of data elements. For example, if MVL is 512 bits then this could be a set of 64 8-bit elements, 32 16-bit elements, 16 32-bit elements, 8 64-bit elements or 4 128-bit elements, for example. It will be appreciated that not all of these options would need to be supported in a given implementation. By supporting variable element size this provides flexibility to handle calculations involving data structures of different precision. To represent a 2D array of data, a group of array vector registers ZAR0-ZAR($N_R$-1) can be logically considered as a single entity assigned a given one of the array register identifiers ZA0-ZA($N_A$-1), so that the 2D array is formed with the elements extending within a single vector register corresponding to one dimension of the array and the elements in the other dimension of the array striped across multiple vector registers.

It can be useful, although not essential, to arrange the array registers ZA so that they store square arrays of data where the number of elements in the horizontal direction equals the number of elements in the vertical direction. This can help to support on-the-fly transposition of arrays where the row/column dimensions of an array structure in memory can be switched on transferring the array structure between the array registers 110 and memory, by providing support to read/write the array registers 110 either in the horizontal direction or in the vertical direction. By providing support to write/read data from a 2D array register in either the horizontal direction or the vertical direction this can allow data loaded in from memory in one direction (e.g. row by row) to be written back to memory in the opposite direction (e.g. column by column), faster than would be possible with a number of gather/scatter load/store or permute operations to transfer data between memory and vector registers.

Figure 3A:
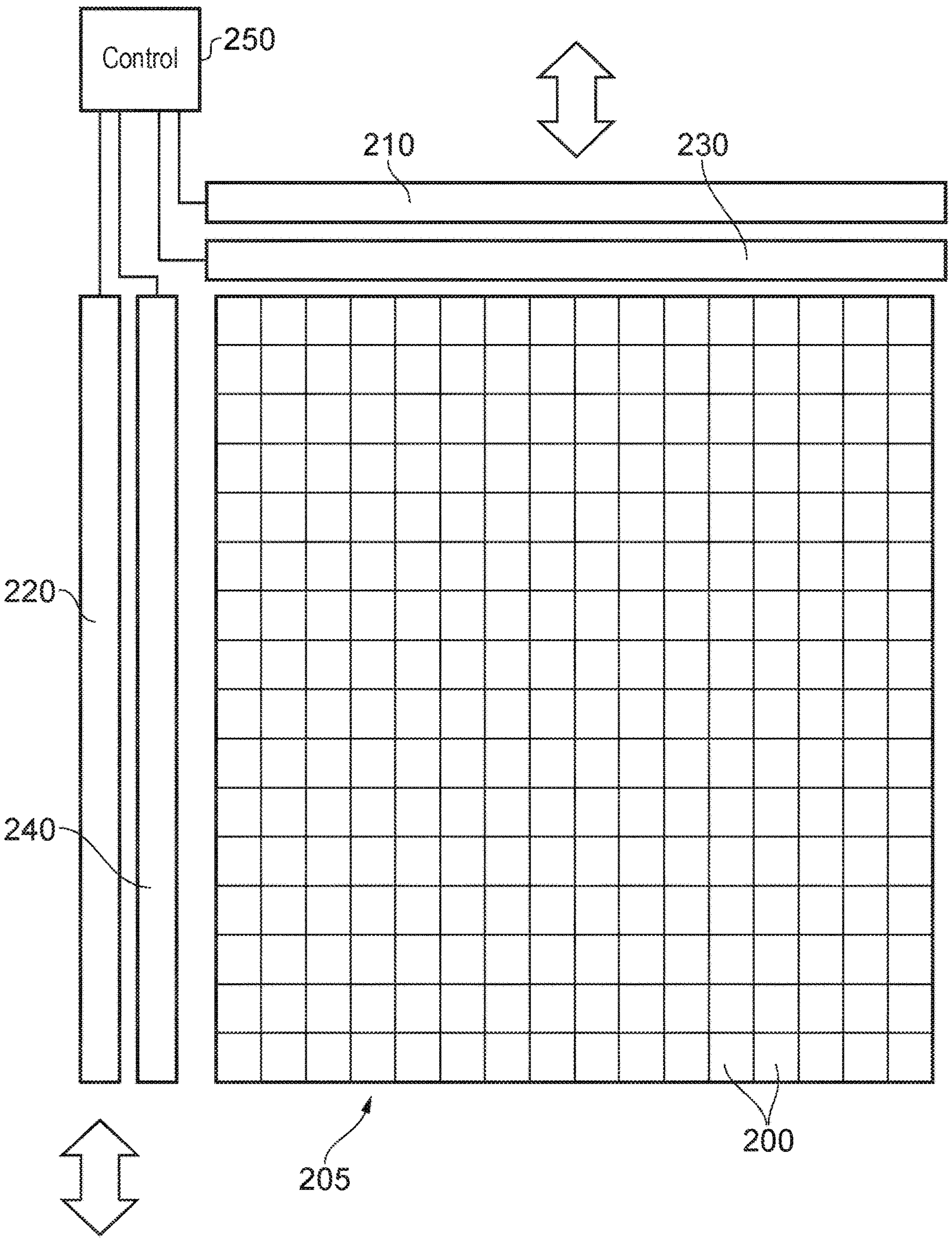
FIGS. 3A and 3B schematically illustrates how accesses may be performed to a square 2D array within the array storage in accordance with one example implementation.

As discussed above, the processing circuitry 60 is arranged, under control of instructions decoded by decoder circuitry 50, to access the scalar registers 70, the vector register 80 and/or the array storage 90. Further details of this latter arrangement will now be described with reference FIG. 3A, which merely provides one illustrative example of how the array storage may be accessed, in particular considering access to a square 2D array within the array storage.

In the illustrated example, a square 2D array within the array storage 90 is arranged as an array 205 of n×n storage elements/locations 200, where n is an integer greater than 1. In the present example, n is 16 which implies that the granularity of access to the storage locations 200 is $\frac{1}{16}^{th}$ of the total storage in either horizontal or vertical array directions.

From the point of view of the processing circuitry, the array of n×n locations are accessible as n linear (one-dimensional) vectors in a first direction (for example, a horizontal direction as drawn) and n linear vectors in a second array direction (for example, a vertical direction as drawn). Hence, the n×n storage locations are arranged or at least accessible, from the point of view of the processing circuitry 60, as 2n linear vectors, each of n data elements.

The array of storage locations 200 is accessible by access circuitry 210, 220, column selection circuitry 230 and row selection circuitry 240, under the control of control circuitry 250 in communication with at least the processing circuitry 60 and optionally with the decoder circuitry 50.

Figure 3B:
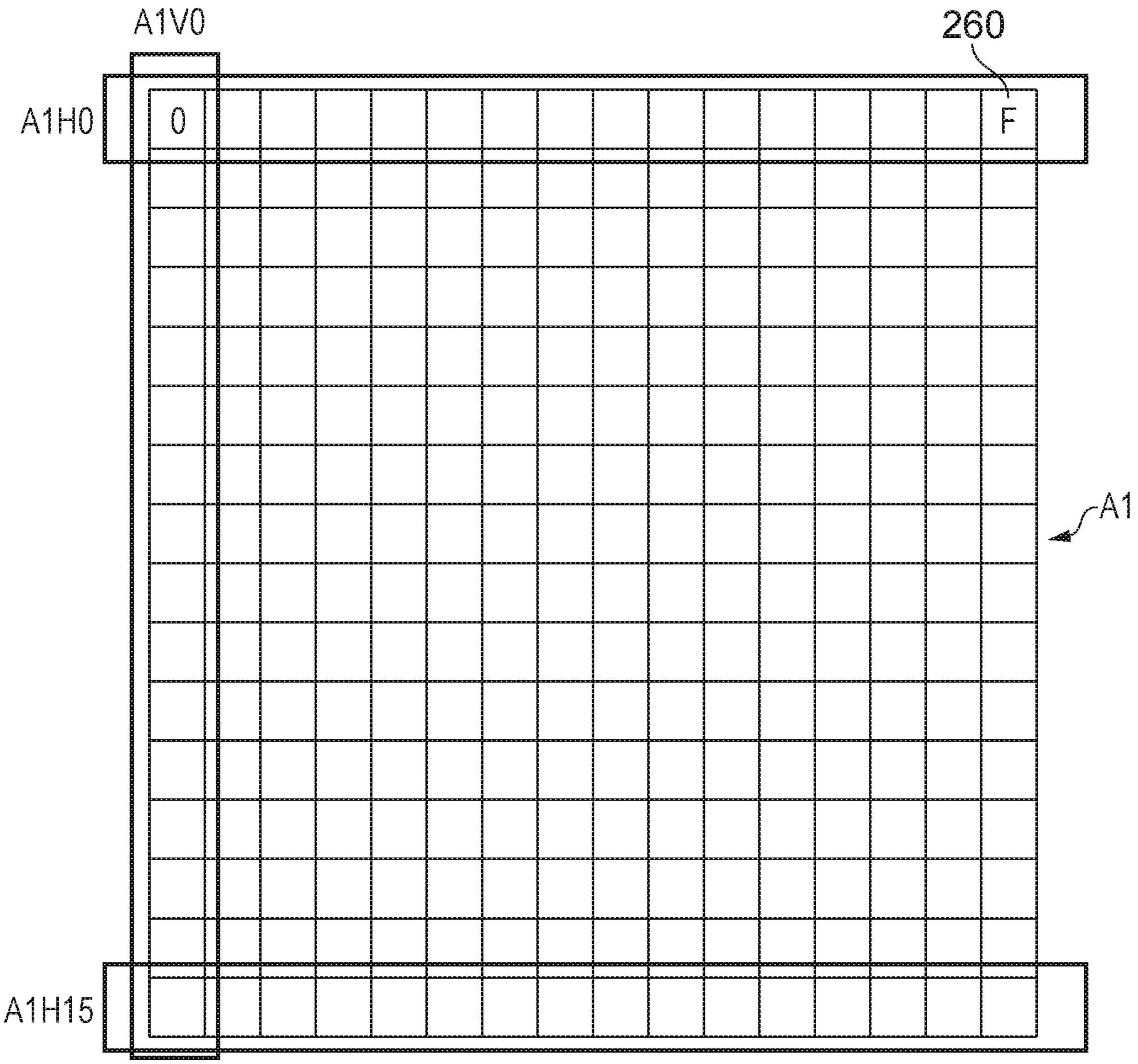

With reference to FIG. 3B, the n linear vectors in the first direction (a horizontal or "H" direction as drawn), in the case of an example square 2D array designated as "A1" (noting that as discussed below, there could be more than one such 2D array provided within the array storage 90, for example A0, A1, A2 and so on) are each of 16 data elements 0 . . . F (in hexadecimal notation) and may be referenced in this example as A1H0 . . . A1H15. The same underlying data, stored in the 256 entries (16×16 entries) of the array storage 90 A1 of FIG. 3B, may instead be referenced in the second direction (a vertical or "V" direction as drawn) as A1V0. . . . A1V15. Note that, for example, a data element 260 is referenced as item F of A1H0 but item 0 of A1V15. Note that the use of "H" and "V" does not imply any spatial or physical layout requirement relating to the storage of the data elements making up the array storage 90, nor does it have any relevance to whether the 2D arrays within the array storage store row or column data in any example application.

Figure 4:
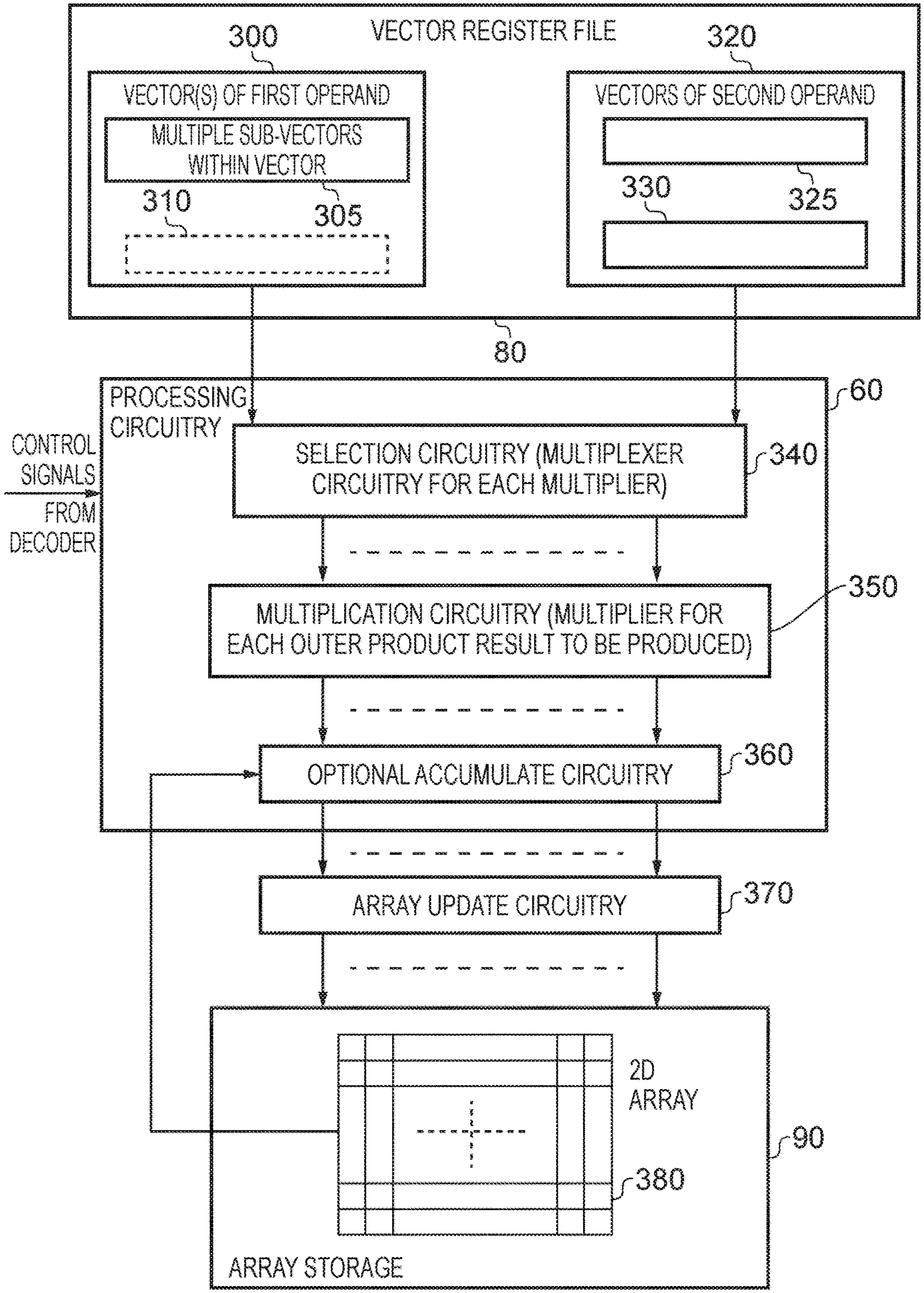
FIG. 4 is a block diagram of an apparatus in accordance with one example implementation, illustrating how the processing circuitry is used to perform outer product operations.

FIG. 4 is a block diagram of an apparatus in accordance with one example implementation, illustrating how the processing circuitry is used to perform outer product operations. The vector register file 80 provides a plurality of vector registers that can be used to store vectors of data elements. As discussed earlier, the multiple outer product instruction can be arranged to identify a first source vector operand 300 and a second source vector operand 320.

At least the first source vector operand 300 is arranged to identify at least one vector of data elements 305 to be treated as comprising a plurality of sub-vectors, and at least the second source vector operand 320 is arranged to identify a plurality of vectors of data elements 325, 330. It should be noted that the terms "first" and "second" used herein to refer to the two source vector operands are used purely as labels to distinguish between the two source vector operands, and do not imply any particular ordering with regards to how those operands are specified by the instruction. Hence, either of the source operand fields of the instruction may be used to specify the first source vector operand referred to above, and the other of the source operand fields will then be used to specify the second source vector operand referred to above.

Further, whilst in accordance with the techniques described herein at least one of the two source vector operands will identify multiple sub-vectors, and the other source vector operand may not, it may also be the case in some example implementations that both source vector operands identify multiple sub-vectors. Similarly, both source vector operands may specify multiple vectors, and hence the first source vector operand 300 may include not only the first vector 305 but also a second vector 310. In addition, the number of vectors specified by any particular source vector operand is not limited to either one vector or two vectors, but indeed more vectors may be specified by a particular source vector operand (for example four vectors or eight vectors).

The processing circuitry 60 is controlled in dependence on control signals received from the decoder circuitry 50, and when the decoder circuitry 50 decodes the earlier-mentioned multiple outer product instruction, it will send control signals to the processing circuitry to control the processing circuitry to perform an outer product operation for each sub-vector identified by the first source vector operand. As part of this process, those control signals will control selection circuitry 340 provided by the processing circuitry 60 to select the appropriate data elements to be processed by each outer product operation. Each outer product operation comprises multiplying each data element of an associated sub-vector identified by the first source vector operand by a group of data elements (either those of a sub-vector or those of a vector) selected from the second source vector operand in order to generate a plurality of outer product results, and then using each outer product result to update a value held in an associated storage element within a given two-dimensional array 380 of storage elements within the array storage 90.

The selection circuitry 340 can be organised in a variety of ways, but in one example implementation comprises multiplexer circuitry provided for each multiplier used to generate an outer product result from two input data elements, that multiplexer circuitry being used to select the appropriate two input data elements for each multiplier. The selection circuitry controls selection of the data elements processed by each outer product operation so as to switch between vectors 325, 330 of the second source vector operand when switching between different sub-vectors within a given vector 305 or 310 of the first source vector operand.

The selected input data elements are then forwarded to multiplication circuitry 350, which as noted above may in one example implementation comprise a multiplier circuit for each outer product result to be produced. Each outer product result is produced by multiplying the two input data elements provided to the corresponding multiplier within the multiplication circuitry 350. The outer product result may be provided directly to array update circuitry 370 used to update the storage elements within the 2D array 380, each outer product result having an associated storage element within the 2D array 380 and being used to update the value held in that associated storage element. However, it is often the case that the outer product operations being performed are accumulate operations, and each outer product result generated is combined with the existing value stored in the associated storage element of the 2D array 380 (for example by adding the outer product result to the existing value or subtracting the outer product result from the existing value), using the optional accumulate circuitry 360. Whilst the multiplication circuitry 350 and optional accumulate circuitry 360 are shown as separate blocks in FIG. 4, in one example implementation they may be provided as a combined block formed of multiply accumulate circuits.

The array update circuitry 370 is used to control access to the relevant storage elements within the 2D array 380, so as to ensure that each value received by the array update circuitry is used to update the associated storage element within the 2D array 380. In one example, the array update circuitry 370 can be implemented using the access components 210 to 250 described earlier with reference to FIG. 3A.

Outer product operations are usefully employed within data processing systems for a variety of different reasons, and hence the ability to perform multiple outer product operations in response to a single instruction can provide significant performance/throughput improvements, as well as making more efficient use of the available storage resources provided by the two-dimensional arrays within the array storage 90. Merely by way of example as to how outer product operations may be used, they can be used to implement matrix multiplication operations. Matrix multiplication may for example involve multiplying a first M×K matrix of data elements by a K×N matrix of data elements to produce an M×N matrix result of data elements. This operation can be decomposed into a plurality of outer product operations (more particularly K outer product operations, where K may be referred to as the depth), where each outer product operation involves performing a sequence of multiply accumulate operations to multiply each data element of an M vector of data elements from the first matrix by each data element of an N vector of data elements from the second matrix to produce an M×N matrix of result data elements stored within the 2D array. The results of the plurality of outer product operations can be accumulated within the same 2D array in order to produce the M×N matrix that would have been generated by performing the earlier-mentioned matrix multiplication.

Figure 5A:
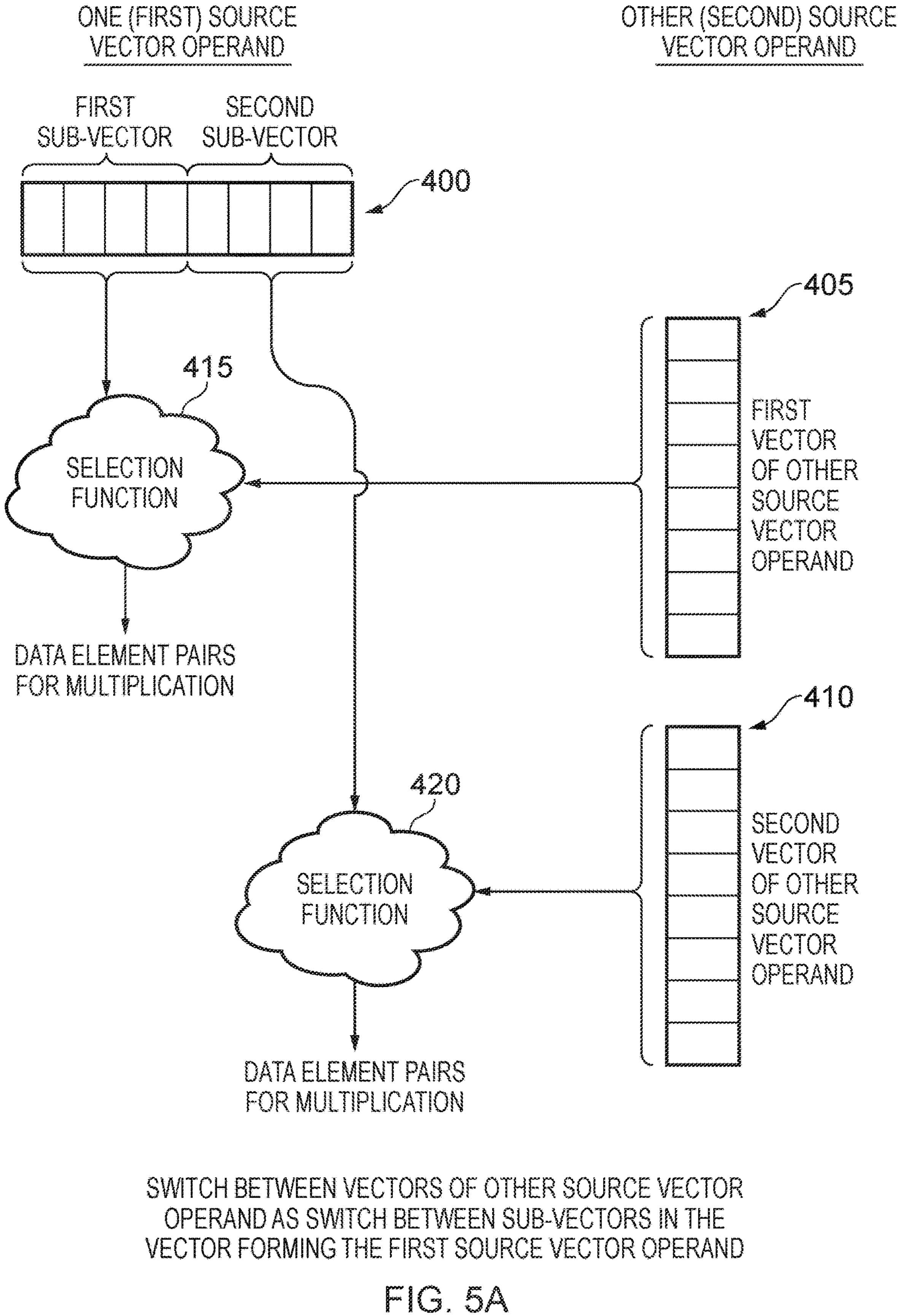
FIGS. 5A and 5B are diagrams schematically illustrating how selection functions are implemented by the selection circuitry of FIG. 4 to switch between the vectors and sub-vectors in order to select the appropriate data elements to be processed by each outer product operation when executing a multiple outer product instruction, in accordance with one example implementation.

FIG. 5A schematically illustrates the selection functions 415, 420 performed by the selection circuitry 340 of FIG. 4, for one example use case where the first source vector operand specifies one vector 400 formed of two sub-vectors, and the second source vector operand specifies two vectors 405, 410, with each of those vectors being considered as a single vector of data elements (rather than being sectioned into sub-vectors).

In this example implementation, execution of the multiple outer product instruction will cause two outer product operations to be performed, with the selection function 415 selecting the data elements to be used for the first outer product operation, and the selection function 420 selecting the data elements to be used to the second outer product operation. As shown in FIG. 5A, for the first outer product operation, the first sub-vector within the vector 400 of the first source vector operand is used, in combination with the first vector 405 of the second source vector operand. Similarly, for the second outer product operation, the second sub-vector within the vector 400 of the first source vector operand is used, in combination with the second vector 410 of the second source vector operand. Hence, it can be seen that the selection circuitry switches between the different vectors 405, 410 of the second source vector operand when switching between different sub-vectors within the first source vector operand 400.

Figure 5B:
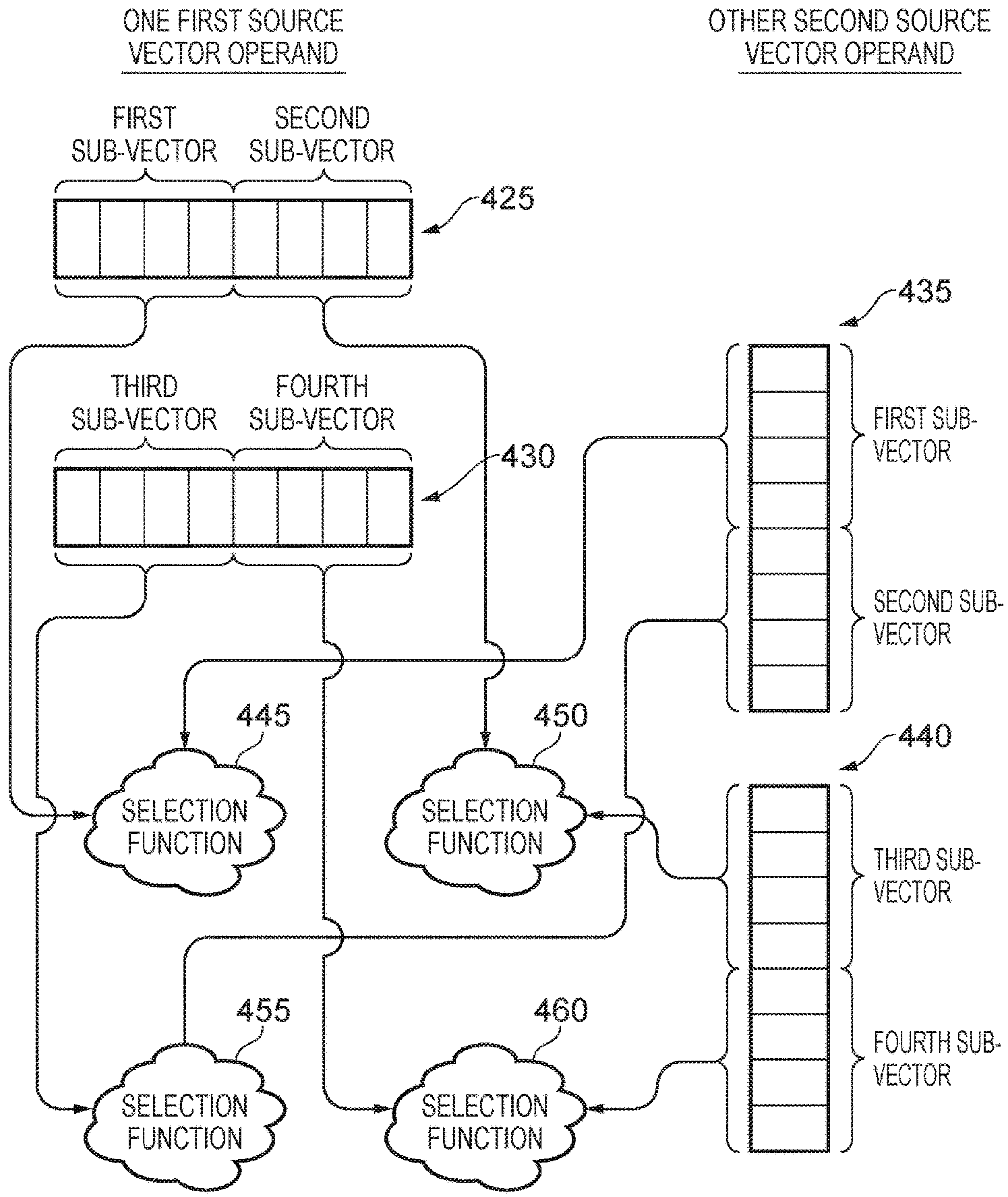

FIG. 5B illustrates another example, where both source vector operands comprise two vectors, and each of the vectors is considered as comprising two sub-vectors. Hence, the first source vector operand comprises the two vectors 425, 430 and the second source vector operand comprises the two vectors 435, 440. In this case, four outer product operations are performed, each having an associated selection function 445, 450, 455, 460 performed by the selection circuitry 340. As can be seen, the selection function 445 associated with the first outer product operation uses the first sub-vector within the first vector 425 of the first source vector operand, in combination with the first sub-vector of the first vector 435 of the second source vector operand, and the selection function 450 associated with the second outer product operation uses the second sub-vector within the first vector 425 of the first source vector operand, in combination with the third sub-vector as provided by the second vector 440 of the second source vector operand. Similarly, the selection function 455 associated with the third outer product operation uses the third sub-vector as provided by the second vector 430 of the first source vector operand, in combination with the second sub-vector of the first vector 435 of the second source vector operand, and the selection function 460 associated with the fourth outer product operation uses the fourth sub-vector as provided by the second vector 430 of the first source vector operand, in combination with the fourth sub-vector as provided by the second vector 440 of the second source vector operand. Again, it can be seen that the selection circuitry switches between different vectors of the second source vector operand when switching between different sub-vectors within a given vector (either the first vector 425 or the second vector 430) of the first source vector operand.

Figure 6:
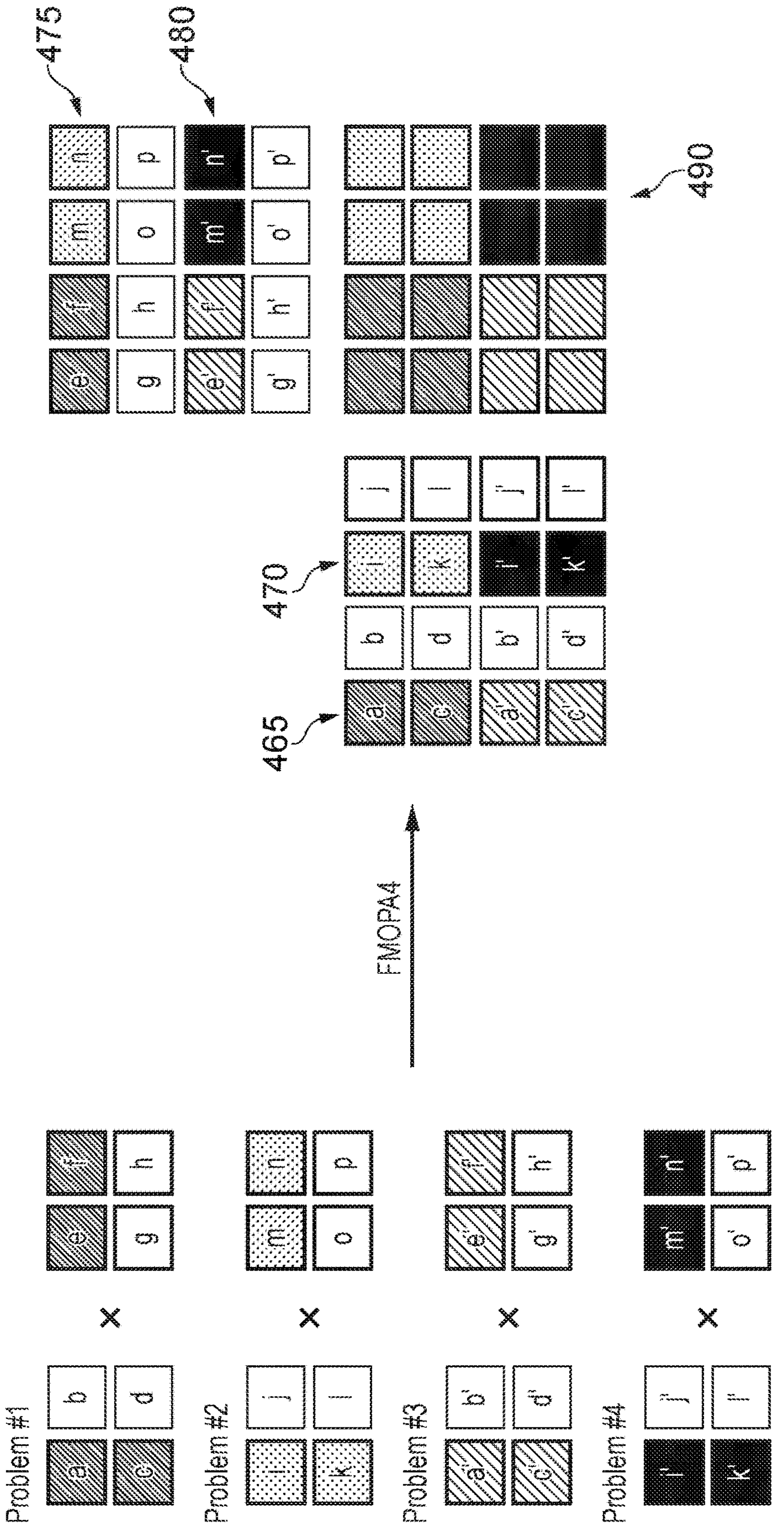
FIGS. 6 to 11 are diagrams schematically illustrating various specific examples of multiple outer product operations that can be performed in response to executing a multiple outer product instruction, in accordance with example implementations.

FIG. 6 is a diagram schematically illustrating one specific example of multiple outer product operations that can be performed in response to executing a multiple outer product instruction. In this case, both source vector operands specify two vectors 465, 470 and 475, 480, respectively, and each of those four vectors is considered as comprising two sub-vectors. This allows four outer product operations to be performed in response to the single instruction, these outer product operations being illustrated schematically in FIG. 6 as problem numbers 1through 4. As can be seen schematically by the illustrated 2D array 490, the results of each of those four outer product operations can be stored within the single 2D array. In particular, in this case each outer product operation produces a 2×2 matrix that can be stored within an associated quarter of the 2D array 490. This hence allows the entirety of the 2D array to be utilised, providing a particularly efficient utilisation of the 2D array, and significantly increasing performance/throughput by avoiding the need to execute separate instructions to implement each of the outer product operations. In this example use case, the multiple outer product instruction is referred to as an FMOPA4 (Floating-point Multiply Outer Product and Accumulate able to perform up to 4 outer products) instruction.

Figure 7:
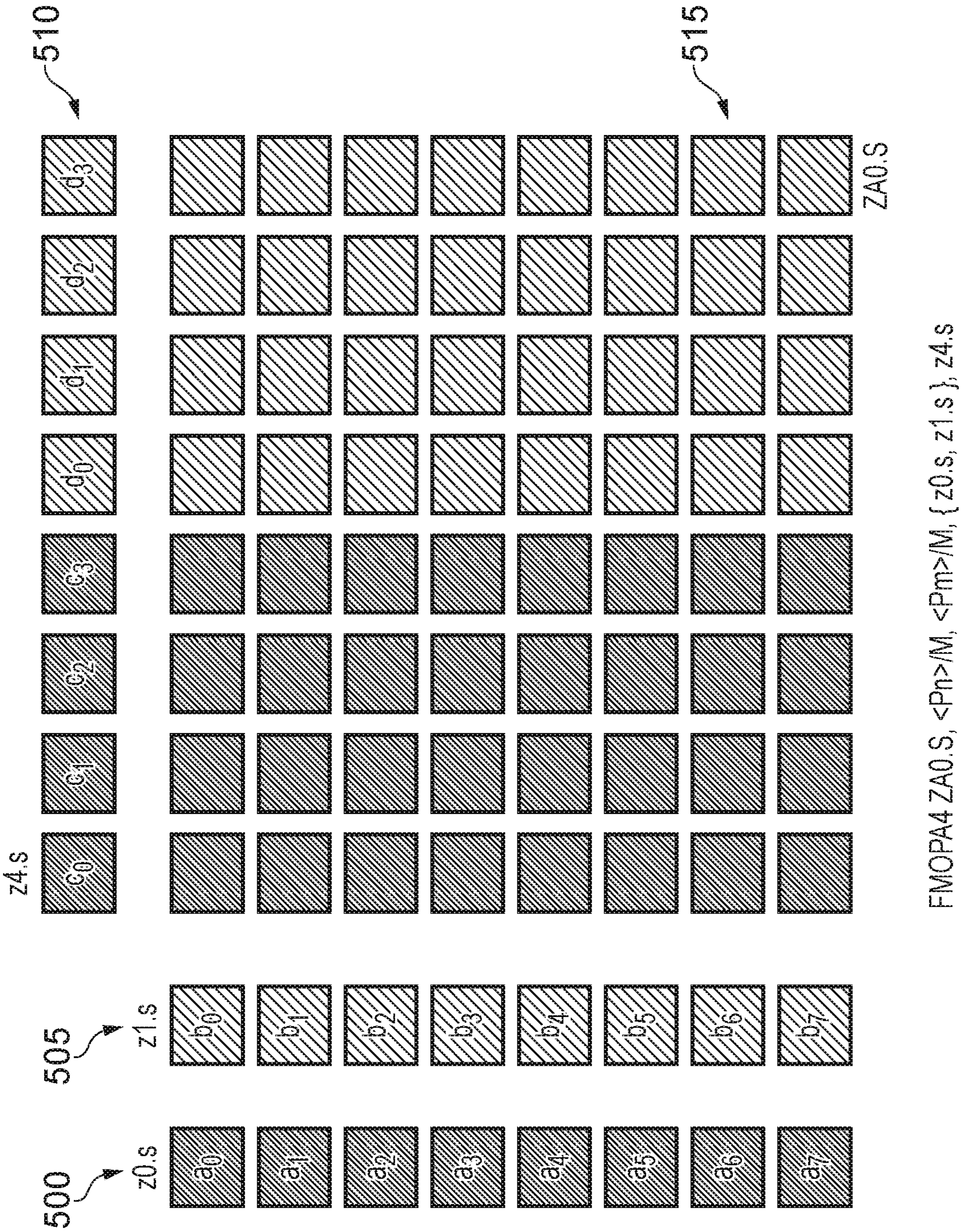

FIG. 7 illustrates another example use case, where only one of the source vector operands identifies multiple sub-vectors. In particular, one source vector operand specifies a single vector 510 formed of two sub-vectors, and the other source vector operand identifies two vectors 500, 505, each of which are considered as comprising a single vector of data elements. In this case, it can be seen that two outer product operations are performed, and again the entirety of the 2D array 515 is utilised, hence providing a particularly efficient and performant approach for implementing the two outer product operations. The multiple outer product instruction is again referred to as an FMOPA4 instruction. This particular instruction identifies the array register ZA0 as the 2D array 515, identifies that one of the source vector operands is formed by the two vector registers z0 and z1, and that the other source vector operand is formed by the vector register z4. The suffix ".s" indicates that the data being processed is single precision floating point data. In this particular example, the instruction may also specify predicates for both the first source vector operand and the second source vector operand, allowing the outer product operations to be performed on selected data elements within the various vectors forming the two source vector operands whilst excluding other data elements. The "/M" suffix indicated next to the predicates stands for "merging", meaning that the current values stored in any storage element of the 2D array associated with predicated (i.e. unused) data elements will remain unmodified when the outer product operations have been performed. This is in contrast to a "/Z" suffix which would indicate that such values should be set to zero.

Figure 8:
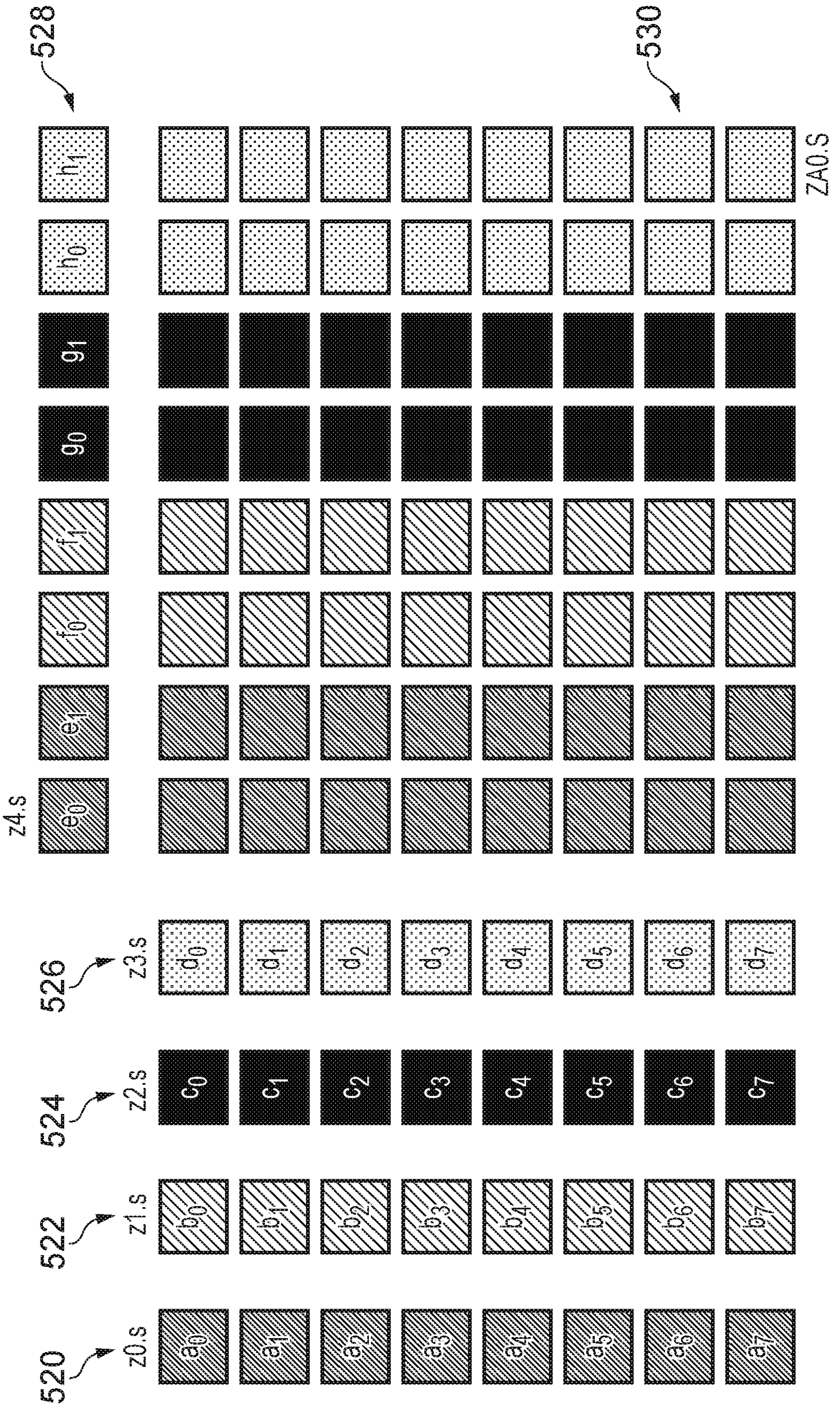

FIG. 8 illustrates a yet further example of the multiple outer product operations that may be performed in response to a multiple outer product instruction, in this case the instruction being referred to as an FMOPA16 (Floating-point Multiply Outer Product and Accumulate able to perform up to 16 outer products) instruction. In this case, one of the source vector operands specifies a single vector 528 consisting of four sub-vectors, whilst the other source vector operand specifies four vectors 520, 522, 524, 526, each of which is considered to comprise a single vector of data elements. As can be seen, four outer product operations are performed in this example, each producing a 2×8 matrix, and all of the outer product results are accommodated within the single 2D array 530.

Figure 9:
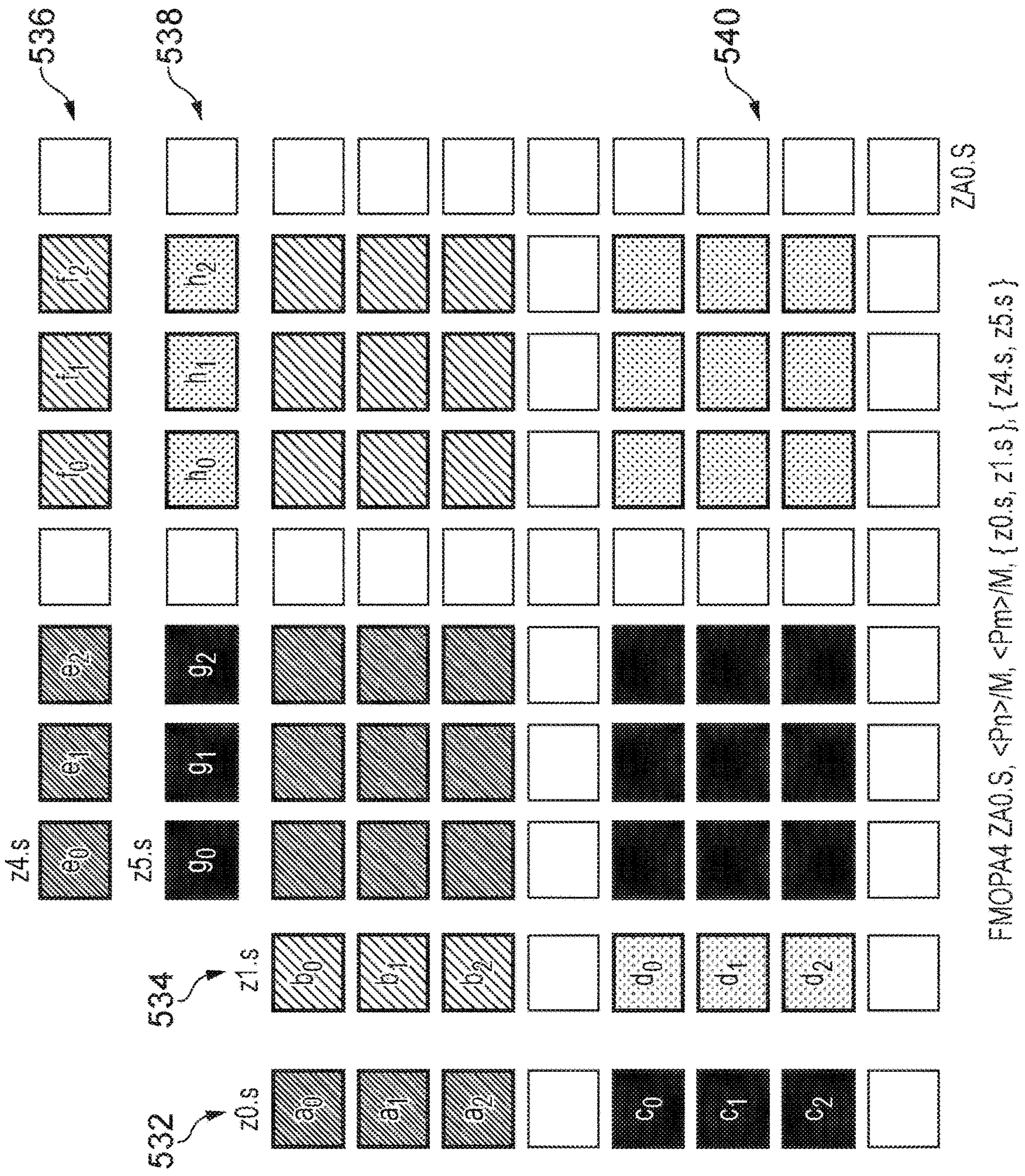

FIG. 9 illustrates a further example scenario where each of the source vector operands is formed of two vectors 536, 538 and 532, 534, respectively, and each of the vectors is considered to comprise two sub-vectors. In this example, the sub-vectors do not actually occupy the entirety of the sub-vector regions. In particular, in this example use case, each sub-vector comprises three data elements, whereas the associated sub-vector region provides four data element locations within the associated vector. Again, four outer product operations are performed, in this case each outer product operation producing a 3×3 matrix that can be stored within an associated region of the single 2D array 540.

Figure 10:
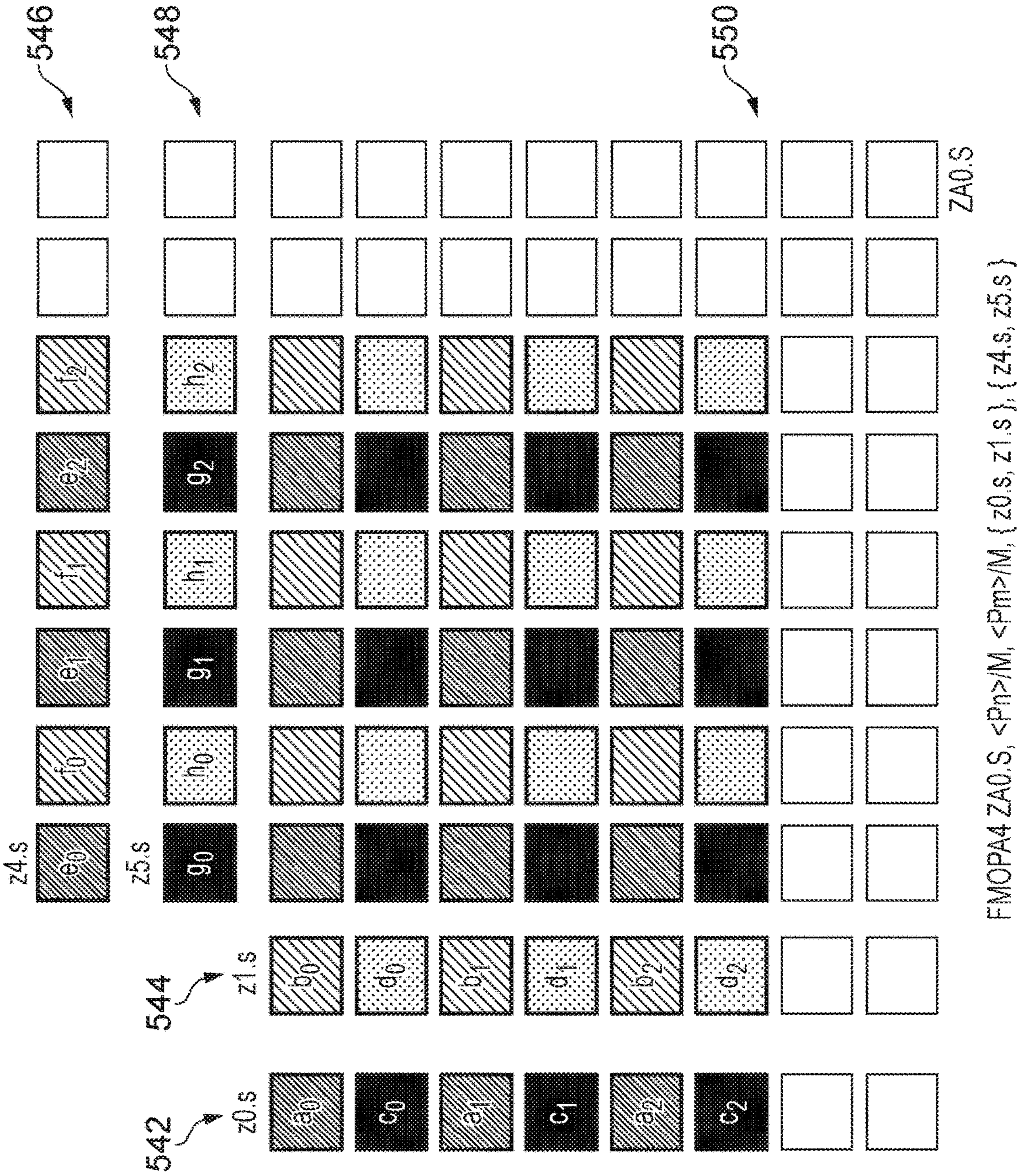

FIG. 10 illustrates a further example use case where each of the source vector operands comprises two vectors 546, 548 and 542, 544, respectively, and each vector is considered as comprising two sub-vectors. However, in this case the data elements forming each sub-vector are not located contiguously within their associated vector, but instead the data elements of different sub-vectors are interleaved. It can be useful to support such flexibility, as it may avoid the need to rearrange data elements within vectors prior to performing the required outer product operations. Again, as in the example of FIG. 9, it can be seen that each sub-vector comprises three data elements, and each outer product operation produces a 3×3 matrix that can be accommodated within the single 2D array 550. However, in this example, the component data elements of each matrix are not stored in adjacent storage elements of the 2D array 550, but instead the storage elements associated with the results of each outer product operation are separated from each other within the 2D array.

Figure 11:
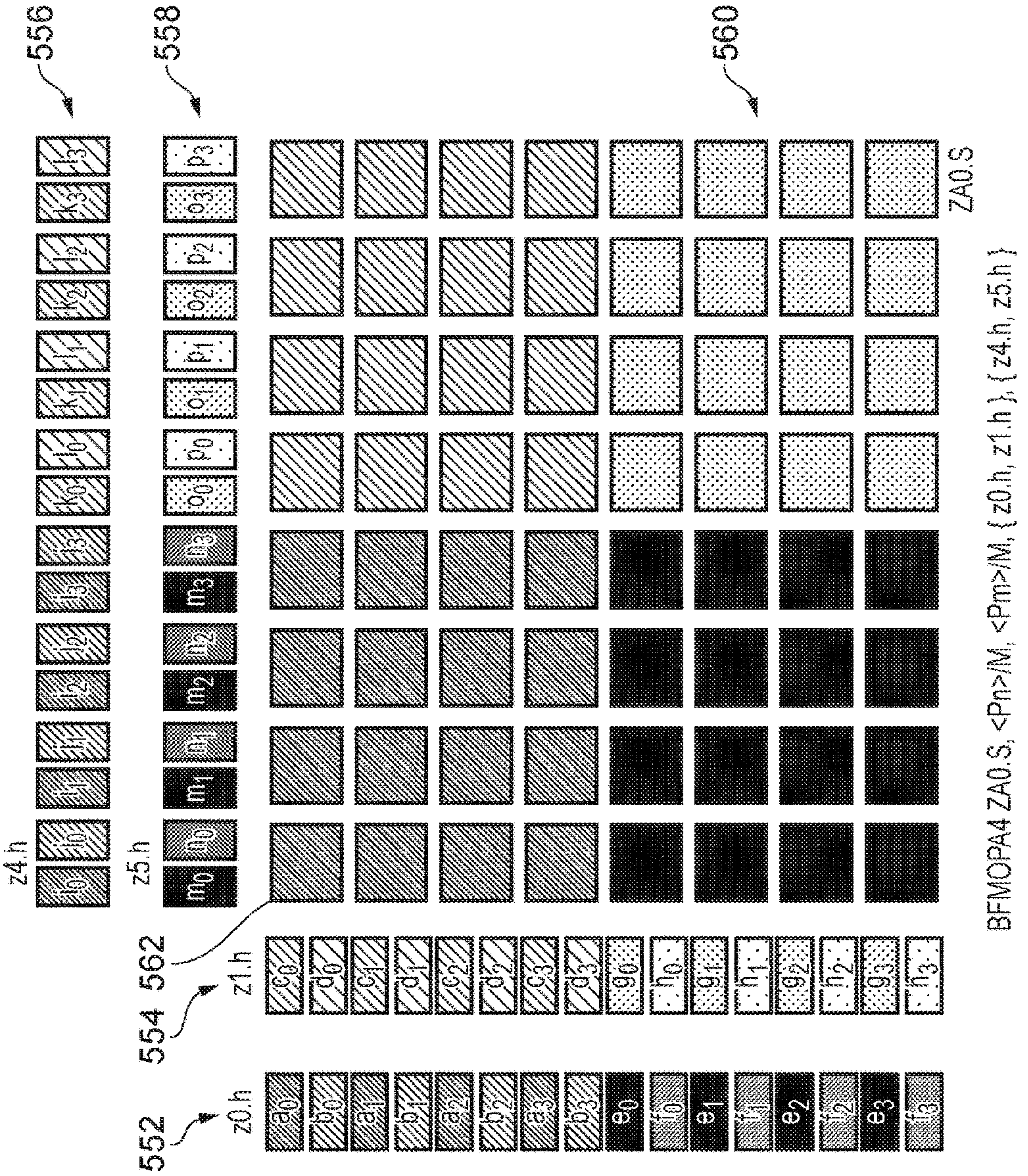

In the examples discussed with reference to FIGS. 6 to 10, each outer product result produced when performing each outer product operation has an associated storage element, and only one outer product result is used to update each associated storage element. However, the techniques described herein can also be used when performing other types of outer product operation, such as a sum of outer products operation. Such a use case is illustrated in FIG. 11, where a multiple outer product instruction (in this case a multiple sum of outer products instruction) is used to perform four sum of outer products operations. As can be seen, each of the two source vector operands specifies two vectors 556, 558 and 552, 554, respectively, each of which is considered to be formed of two sub-vectors. However, the data element size within each sub-vector is reduced, and two outer product results are associated with each storage element within the 2D array 560. Hence, by way of specific example, both a first outer product result computed by multiplying $a_0$ by $i_0$ and a second outer product result computed by multiplying $b_0$ by $j_0$ are added together to produce a value used to update the associated storage element 562. In this example, it can be seen that four sum of outer product operations (eight raw outer product operations) are performed, each producing a 4×4 matrix, and the results of each of those outer product operations can all be accommodated within the single 2D array 560. In this example the instruction is referred to as a BFMOPA4 instruction, where the “B” in “BFMOPA4” indicates the BFloat 16 data type.

Figure 12A:
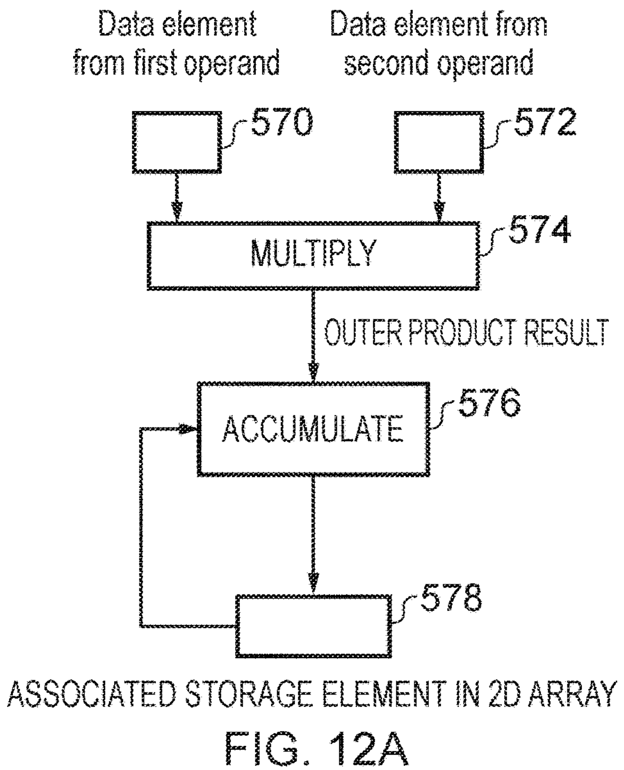
FIGS. 12A and 12B illustrate how generated outer product results can be used to update an associated storage element within a 2D array of the array storage, in accordance with example implementations.

FIG. 12A illustrates how an outer product result may be associated with a particular storage element in the 2D array. In the example of FIG. 12A, a data element 570 from the first source vector operand is multiplied by a data element 572 from the second source vector operand using the multiply function 574, producing an outer product result which is then subjected to an accumulate operation by the accumulate function 576 to add that outer product result to the current value stored in the associated storage element 578 (or to subtract that outer product result from the current value stored in the associated storage element 578) in order to produce an updated value that is then stored in the associated storage element.

Figure 12B:
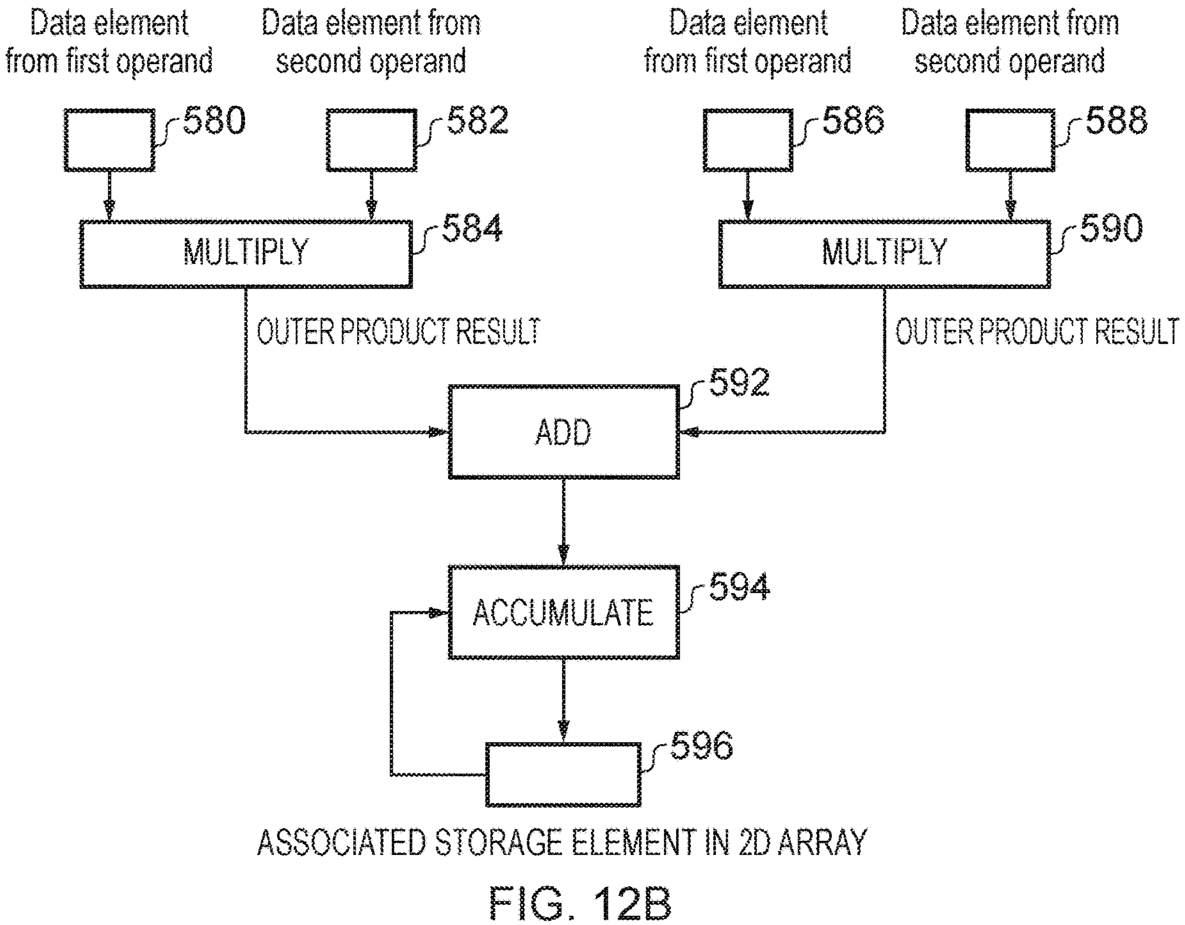

FIG. 12B illustrates a sum of outer products operation where two outer product results are associated with the same storage element within the 2D array. In this example, a data element 580 from the first source vector operand is multiplied by a data element 582 from the second source vector operand using the multiply function 584 in order to produce a first outer product result. Similarly, a data element 586 from the first source vector operand and a data element 588 from the second source vector operand are multiplied by the multiply function 590 in order to produce a second outer product result. The two outer product results are then added together using the add function 592, and an accumulate function 594 is performed in order to produce an updated data value for storing in the associated storage element 596. Hence, it will be appreciated that in some implementations there can be more than one outer product result associated with the same storage element in the 2D array.

Figure 13:
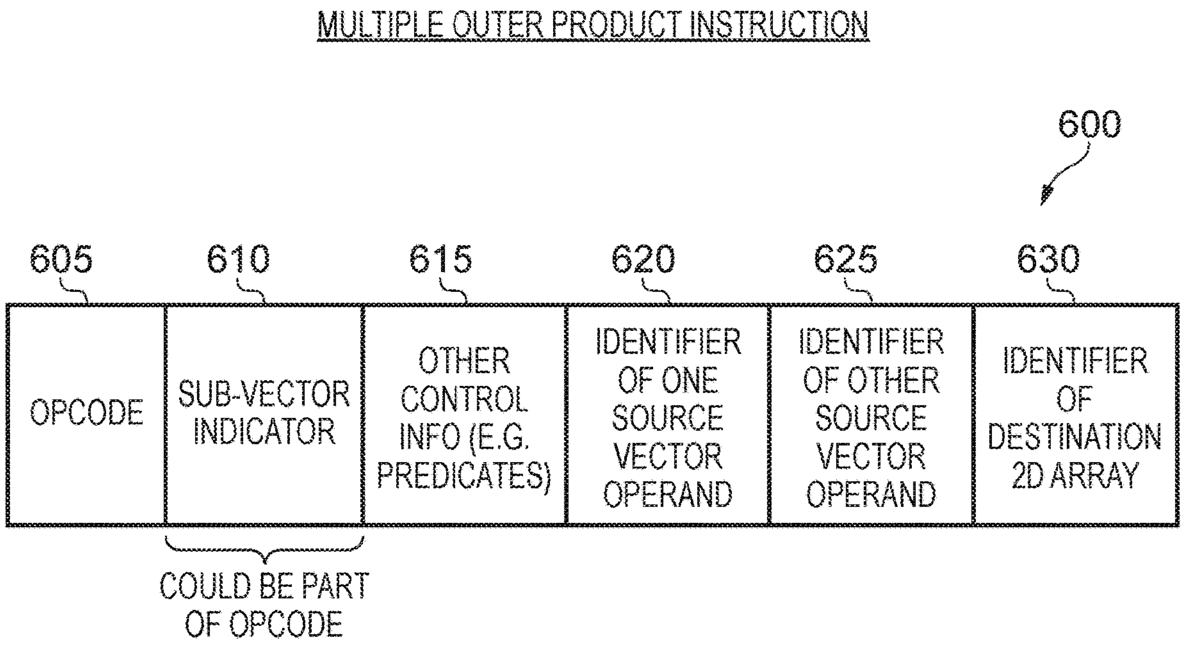
FIG. 13 schematically illustrates fields that may be provided within a multiple outer product instruction in accordance with one example implementation.

FIG. 13 is a diagram schematically illustrating fields that may be provided within the multiple outer product instruction, in accordance with one example implementation. An opcode field 605 is used to identify the type of instruction, in this case identifying that the instruction is a multiple outer product instruction. A sub-vector indicator field 610 can then be used to identify the number of sub-vectors within each of the one or more vectors that are to be considered as comprising sub-vectors. As discussed earlier, in one example implementation the sub-vector indication value in the field 610 can be specified in a way that is vector length agnostic, for example by specifying each sub-vector region to be a specific fraction of the vector length (such that the actual size of each sub-vector region is dependent on the vector length but knowledge of the vector length is not required when specifying the sub-vector indication value). As also discussed earlier, in an alternative example implementation an explicit sub-vector indicator field 610 may not be provided, and instead an indication of the sub-vector size may be directly encoded within the opcode field 605, effectively providing different variants of the instruction for different sub-vector sizes.

One or more other control information fields 615 can be provided, for example to identify one or more predicates as referred to earlier. The field 620 is then used to identify one of the source vector operands, for example by specifying one or more vector registers within the vector register file 80 that are to provide the data elements of that source vector operand. Similarly, a field 625 can be used to identify the other source vector operand, again for example by specifying one or more vector registers within the vector register file 80 that are to provide the data elements of that source vector operand. As discussed earlier, either one of the fields 620, 625 can be used to specify the earlier-mentioned first source vector operand, with the other field then specifying the second source vector operand. Finally, the field 630 may be used to identify the destination 2D array within the array storage 90 that is to be used to store the matrices generated as a result of performing the multiple outer product operations specified by the multiple outer product instruction.

Figure 14:
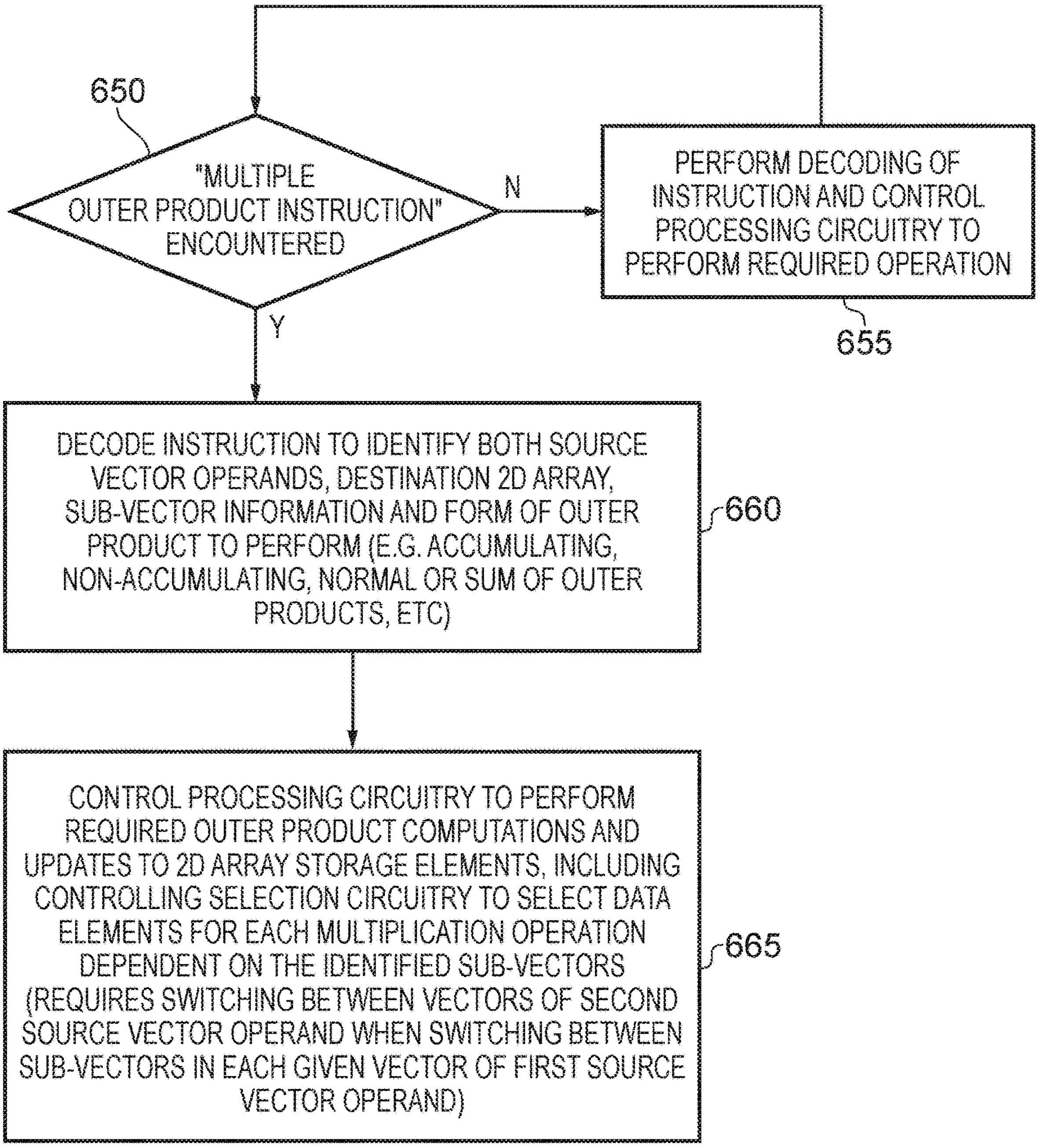
FIG. 14 is a flow diagram illustrating the steps performed upon decoding a multiple outer product instruction, in accordance with one example implementation.

FIG. 14 is a flow diagram illustrating steps performed on decoding a multiple outer product instruction in accordance with one example implementation. At step 650, it is determined whether a multiple outer product instruction has been encountered. If not, then standard decoding of the relevant instruction is performed at step 655, with the processing circuitry then being controlled to perform the required operation defined by that instruction.

However, if a multiple outer product instruction is encountered, then at step 660 that instruction is decoded in order to identify both of the source vector operands, the destination 2D array, the required sub-vector information, and the form of outer product that is to be performed (for example whether an accumulating outer product is being performed or a non-accumulating variant is being performed, and also for example whether normal outer product operations are to be performed or sum of outer products operations are to be performed).

Then, at step 665, the processing circuitry is controlled to perform the required outer product operations and to perform the required updates to the 2D array storage elements. As part of this process, selection circuitry is controlled to select the data elements for each multiplication operation dependent on the identified sub-vectors. As discussed earlier, this involves switching between vectors of the second source vector operand when switching between different sub-vectors in any given vector of the first source vector operand.

Figure 15:
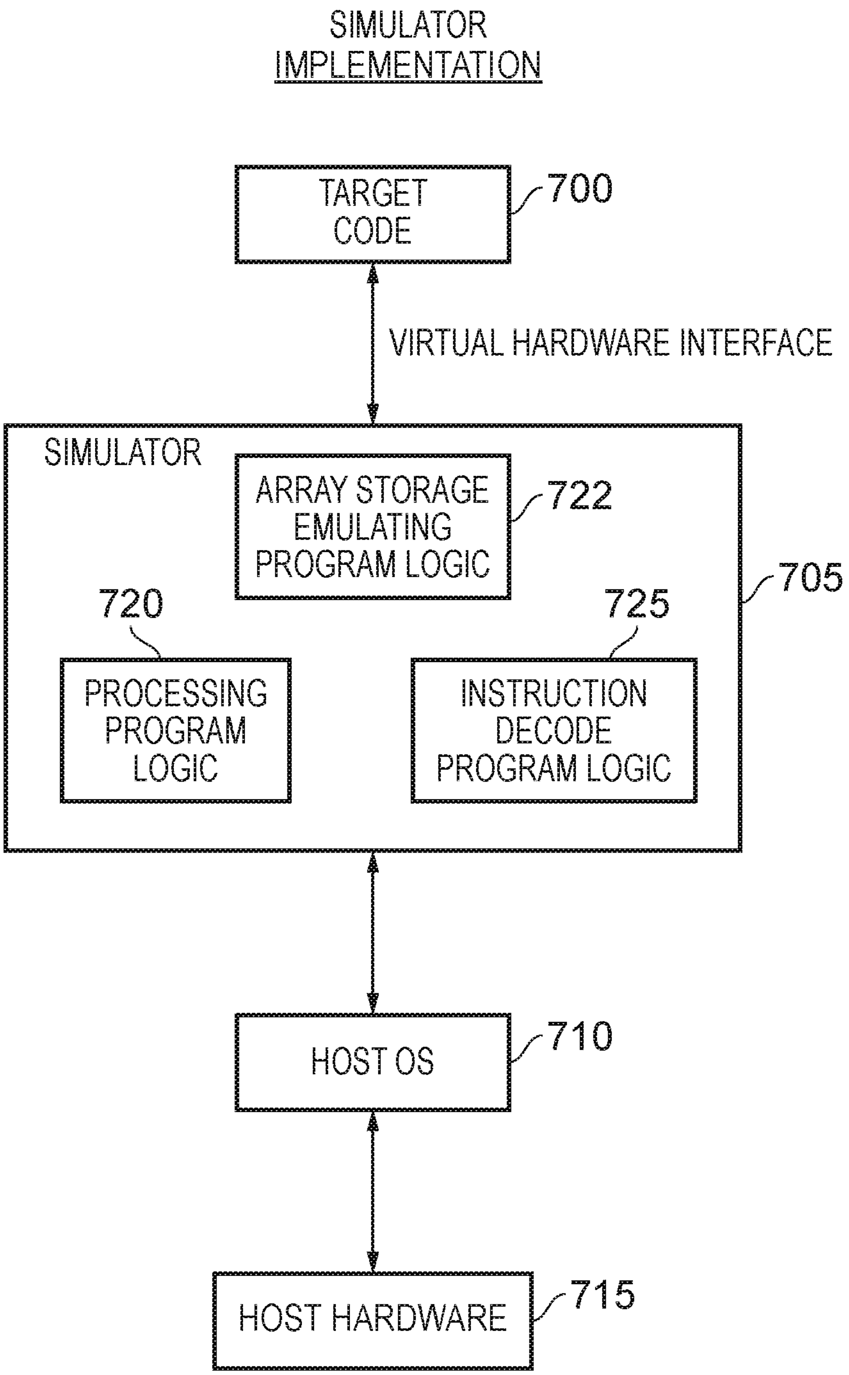
FIG. 15 illustrates a simulator implementation that may be used.

FIG. 15 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 715, optionally running a host operating system 710, supporting the simulator program 705. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 30 in the hardware apparatus 10 could be emulated as a simulated address space which is mapped on to the virtual address space used by the host operating system 710 by the simulator 705. In arrangements where one or more of the hardware elements referenced in the previously described examples are present on the host hardware (for example host processor 715), some simulated implementations may make use of the host hardware, where suitable.

The simulator program 705 may be stored on a computer readable storage medium (which may be a non-transitory medium), and provides a virtual hardware interface (instruction execution environment) to the target code 700 (which may include applications, operating systems and a hypervisor) which is the same as the hardware interface of the hardware architecture being modelled by the simulator program 705. Thus, the program instructions of the target code 700 may be executed from within the instruction execution environment using the simulator program 705, so that a host computer 715 which does not actually have the hardware features of the apparatus 10 discussed above can emulate those features. The simulator program may include processing program logic 720 to emulate the behaviour of the processing circuitry 60, instruction decode program logic 725 to emulate the behaviour of the instruction decoder circuitry 50, and array storage emulating program logic 722 to maintain data structures to emulate the array storage 90. Hence, the techniques described herein can in the example of FIG. 15 be performed in software by the simulator program 705.

As will be apparent from the earlier discussion of example implementations of the present technique, the techniques described herein provide a single instruction (namely the multiple outer product instruction discussed above) that, through the use of sub-vectors within one or both of the source vector operands, enables multiple outer product operations to be performed, with the results of each outer product operation being stored within associated storage elements of a chosen two-dimensional array within the array storage. This can significantly improve throughput, by enabling multiple outer product operations to be performed in response to a single instruction, whilst also making more efficient utilisation of the available storage elements within the array storage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry configured to perform vector operations;

instruction decoder circuitry configured to decode instructions from a set of instructions to control the processing circuitry to perform the vector operations specified by the instructions;

array storage comprising storage elements configured to store data elements, the array storage being configured to store at least one two dimensional array of data elements accessible to the processing circuitry when performing the vector operations;

wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements;

wherein the instruction decoder circuitry is configured, in response to the multiple outer product instruction, to control the processing circuitry to perform an outer product operation for each sub-vector identified by the first source vector operand, and each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements;

wherein the processing circuitry comprises selection circuitry configured to control selection of the data elements processed by each outer product operation so as to switch between vectors of the second source vector operand when switching between different sub-vectors within a given vector of the first source vector operand.

2. An apparatus as claimed in claim 1, wherein the selection circuitry comprises, for each multiplication operation to be performed by the processing circuitry to generate a corresponding outer product result, associated multiplexer circuitry to select a data element from the first source vector operand and a data element from the second source vector operand to be subjected to the multiplication operation, with the selection made by the associated multiplexer circuitry being controlled in dependence on which outer product operation the corresponding outer product result relates to.

3. An apparatus as claimed in claim 1, wherein both the first source vector operand and the second source vector operand identify a plurality of vectors of data elements, and each vector is to be treated as comprising a plurality of sub-vectors.

4. An apparatus as claimed in claim 3, wherein each of the first source vector operand and the second source vector operand contain N sub-vectors, and the processing circuitry is configured to perform N outer product operations.

5. An apparatus as claimed in claim 3, wherein:

the plurality of sub-vectors within each vector of the first source vector operand have associated sub-vectors within different vectors of the second source vector operand; and the selection circuitry is configured to control selection of the data elements processed by each outer product operation such that, when switching between different sub- vectors within a given vector of the first source vector operand, a switch is made to a different vector of the second source vector operand so as to enable the data elements from the associated sub-vectors within the second source vector operand to be selected.

6. An apparatus as claimed in claim 1, wherein the first source vector operand contains a plurality P of sub-vectors, and the second source vector operand comprises P vectors of data elements, where each vector in the second source vector operand is associated with one of the sub-vectors in the first source vector operand.

7. An apparatus as claimed in claim 6, wherein the processing circuitry is configured to perform P outer product operations, where each outer product operation is performed using as inputs an associated sub-vector from the first source vector operand and an associated vector from the second source vector operand.

8. An apparatus as claimed in claim 1, wherein, for at least one given vector to be treated as comprising a plurality of sub-vectors, the data elements forming each sub-vector are provided at contiguous data element locations within the given vector.

9. An apparatus as claimed in claim 1, wherein, for at least one given vector to be treated as comprising a plurality of sub-vectors, the data elements forming each sub-vector are provided at non-contiguous data element locations within the given vector.

10. An apparatus as claimed in claim 1, wherein, for at least one given vector to be treated as comprising a plurality of sub-vectors, the given vector may have one or more unused data element locations that do not contain a data element of the plurality of sub-vectors.

11. An apparatus as claimed in claim 1, further comprising: a set of vector registers accessible to the processing circuitry, where each vector register is configured to store a vector comprising a plurality of data elements, and the first source vector operand and the second source vector operand comprise vectors contained within vector registers of the set of vector registers.

12. An apparatus as claimed in claim 11, wherein:

a vector length identifies a size of the vector registers in the set of vector registers and a size of the given two dimensional array of data elements within the array storage; and the multiple outer product instruction is arranged to provide a sub-vector indicator used to determine the number of sub-vectors within each vector that is to be treated as comprising a plurality of sub-vectors, with a size of each sub-vector being dependent on the determined number of sub-vectors and the vector length.

13. An apparatus as claimed in claim 12, wherein the sub-vector indicator is specified in a manner that is agnostic to the vector length.

14. An apparatus as claimed in claim 1, wherein the multiple outer product instruction is an accumulate instruction and each outer product result is used to update an existing value held in the associated storage element within the given two dimensional array of storage elements by combining that outer product result with the existing value.

15. An apparatus as claimed in claim 1, wherein the multiple outer product instruction is a sum of outer products instruction, multiple outer product results have the same associated storage element within the given two dimensional array of storage elements, and those multiple outer product results are combined in order to update the value held in the associated storage element.

16. An apparatus as claimed in claim 1, wherein both the first source vector operand and the second source vector operand comprise two vectors, each vector is formed of two sub-vectors, and the instruction decoder circuitry is configured, in response to the multiple outer product instruction, to control the processing circuitry to perform four outer product operations with the results of those four outer product operations being stored within storage elements within associated regions of the given two dimensional array of storage elements.

17. A method of performing outer product operations, comprising:

employing processing circuitry to perform vector operations;

employing instruction decoder circuitry to decode instructions from a set of instructions to control the processing circuitry to perform the vector operations specified by the instructions;

providing array storage comprising storage elements to store data elements, the array storage being arranged to store at least one two dimensional array of data elements accessible to the processing circuitry when performing the vector operations;

wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements;

controlling the processing circuitry to perform, in response to the multiple outer product instruction being decoded by the instruction decoder circuitry, an outer product operation for each sub-vector identified by the first source vector operand, where each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements; and controlling selection of the data elements processed by each outer product operation so as to switch between vectors of the second source vector operand when switching between different subvectors within a given vector of the first source vector operand.

18. A non-transitory, computer-readable storage medium storing a computer program, which when executed by a host data processing apparatus, controls the host data processing apparatus to provide an instruction execution environment comprising:

processing program logic to perform vector operations;

instruction decode program logic to decode instructions from a set of instructions to control the processing program logic to perform the vector operations specified by the instructions;

array storage emulating program logic to emulate an array storage comprising storage elements to store data elements, the array storage being arranged to store at least one two dimensional array of data elements accessible to the processing program logic when performing the vector operations;

wherein the set of instructions includes a multiple outer product instruction identifying a first source vector operand, a second source vector operand, and a given two dimensional array of data elements within the array storage forming a destination operand, wherein at least the first source vector operand identifies at least one vector of data elements to be treated as comprising a plurality of sub-vectors and at least the second source vector operand identifies a plurality of vectors of data elements;

wherein the instruction decode program logic is arranged, in response to the multiple outer product instruction, to control the processing program logic to perform an outer product operation for each sub-vector identified by the first source vector operand, and each outer product operation comprises multiplying each data element of an associated sub-vector identified by the first source vector operand by each data element of a group of data elements selected from the second source vector operand in order to generate a plurality of outer product results, and using each outer product result to update a value held in an associated storage element within the given two dimensional array of storage elements;

wherein the processing program logic comprises selection program logic to control selection of the data elements processed by each outer product operation so as to switch between vectors of the second source vector operand when switching between different sub-vectors within a given vector of the first source vector operand.

* * * * *